US009073490B2

(12) United States Patent
Uken et al.

(10) Patent No.: US 9,073,490 B2

(45) Date of Patent: Jul. 7, 2015

(54) METHOD OF COATING A REAR GLASS SUBSTRATE FOR AN ELECTROCHROMIC MIRROR REFLECTIVE ELEMENT

(71) Applicant: MAGNA MIRRORS OF AMERICA, INC., Holland, MI (US)

(72) Inventors: John T. Uken, Jenison, MI (US); Michael J. Baur, Holland, MI (US); Ian A. McCabe, Holland, MI (US); Hamid Habibi, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 14/195,139

(22) Filed: Mar. 3, 2014

(65) Prior Publication Data

US 2014/0173894 A1 Jun. 26, 2014

Related U.S. Application Data

(63) Continuation of application No. 13/959,036, filed on Aug. 5, 2013, now Pat. No. 8,665,510, which is a continuation of application No. 13/262,091, filed as application No. PCT/US2010/029173 on Mar. 30,2010, now Pat. No. 8,503,061.

(Continued)

(51) Int. Cl.
*G02F 1/153* (2006.01)
*B60R 1/08* (2006.01)
(Continued)

(52) U.S. Cl.
CPC ........... *B60R 1/088* (2013.01); *Y10T 29/49162* (2015.01); *G02F 1/153* (2013.01); *G02F 1/157* (2013.01); *G02F 1/133553* (2013.01)

(58) Field of Classification Search
CPC .................................................. G02F 1/13353
USPC ................ 359/267, 602, 604, 838, 844, 900; 204/192.27; 345/105; 29/850
See application file for complete search history.

(56) References Cited

U.S. PATENT DOCUMENTS

| | | | |
|---|---|---|---|
| 4,712,879 | A | 12/1987 | Lynam et al. |
| 4,882,466 | A | 11/1989 | Friel |

(Continued)

FOREIGN PATENT DOCUMENTS

| | | |
|---|---|---|
| WO | WO2011/044312 | 4/2011 |

OTHER PUBLICATIONS

International Search Report and Written Opinion from PCT Application No. PCT/US2010/029173.

*Primary Examiner* — Tuyen Tra

(74) *Attorney, Agent, or Firm* — Gardner, Linn, Burkhart & Flory, LLP

(57) ABSTRACT

A method of coating a rear glass substrate for an electrochromic reflective element includes providing a fixture having a recess and a masking element extending from a perimeter region of the recess over a portion of the recess. The masking element includes a disc portion and an arm portion extending between the disc portion and the perimeter region of the recess of the fixture. A rear glass substrate is positioned in the recess and the masking element extends over and is spaced from the surface of the glass substrate. The glass substrate surface is coated with a mirror reflector coating. The masking element is shaped such that the mirror reflector coating is deposited at the surface behind the arm portion but is substantially not deposited behind the disc portion so as to establish a window region through the mirror reflector coating at the glass substrate surface.

20 Claims, 21 Drawing Sheets

Related U.S. Application Data

(60) Provisional application No. 61/288,923, filed on Dec. 22, 2009, provisional application No. 61/232,246, filed on Aug. 7, 2009, provisional application No. 61/186,204, filed on Jun. 11, 2009, provisional application No. 61/164,593, filed on Mar. 30, 2009.

(51) Int. Cl.

| | |
|---|---|
| ***G02F 1/1335*** | (2006.01) |
| *G02F 1/157* | (2006.01) |

(56) References Cited

U.S. PATENT DOCUMENTS

| | | | | |
|---|---|---|---|---|
| 5,066,112 | A | 11/1991 | Lynam et al. | |
| 5,073,012 | A | 12/1991 | Lynam | |
| 5,076,673 | A | 12/1991 | Lynam et al. | |
| 5,115,346 | A | 5/1992 | Lynam | |
| 5,140,455 | A | 8/1992 | Varaprasad et al. | |
| 5,142,407 | A | 8/1992 | Varaprasad et al. | |
| 5,151,816 | A | 9/1992 | Varaprasad et al. | |
| 5,233,461 | A | 8/1993 | Dornan et al. | |
| 5,253,109 | A | 10/1993 | O'Farrell et al. | |
| 5,406,414 | A | 4/1995 | O'Farrell et al. | |
| 5,521,760 | A | 5/1996 | DeYoung et al. | |
| 5,525,264 | A | 6/1996 | Cronin et al. | |
| 5,530,240 | A | 6/1996 | Larson et al. | |
| 5,567,360 | A | 10/1996 | Varaprasad et al. | |
| 5,610,756 | A | 3/1997 | Lynam et al. | |
| 5,668,663 | A | 9/1997 | Varaprasad et al. | |
| 5,724,187 | A | 3/1998 | Varaprasad et al. | |
| 5,725,957 | A | 3/1998 | Varaprasad et al. | |
| 5,808,777 | A | 9/1998 | Lynam et al. | |
| 5,818,625 | A | 10/1998 | Forgette et al. | |
| 5,910,854 | A | 6/1999 | Varaprasad et al. | |
| 5,985,184 | A | 11/1999 | Lynam | |
| 6,002,511 | A | 12/1999 | Varaprasad et al. | |
| 6,102,546 | A | 8/2000 | Carter | |
| 6,154,306 | A | 11/2000 | Varaprasad et al. | |
| 6,166,848 | A | 12/2000 | Cammenga et al. | |
| 6,178,034 | B1 | 1/2001 | Allemand et al. | |
| 6,249,369 | B1 | 6/2001 | Theiste et al. | |
| 6,297,900 | B1 | 10/2001 | Tulloch et al. | |
| 6,329,925 | B1 | 12/2001 | Skiver et al. | |
| 6,356,376 | B1 | 3/2002 | Tonar et al. | |
| 6,606,184 | B2 | 8/2003 | Guarr et al. | |
| 6,665,107 | B2 | 12/2003 | Forgette et al. | |
| 6,690,268 | B2 | 2/2004 | Schofield et al. | |
| 7,004,592 | B2 | 2/2006 | Varaprasad et al. | |
| 7,064,882 | B2 | 6/2006 | Tonar et al. | |
| 7,184,190 | B2 | 2/2007 | McCabe et al. | |
| 7,195,381 | B2 | 3/2007 | Lynam et al. | |
| 7,202,987 | B2 | 4/2007 | Varaprasad et al. | |
| 7,255,451 | B2 | 8/2007 | McCabe et al. | |
| 7,256,923 | B2 | 8/2007 | Liu et al. | |
| 7,274,501 | B2 | 9/2007 | McCabe et al. | |
| 7,310,177 | B2 | 12/2007 | McCabe et al. | |
| 7,310,178 | B2 | 12/2007 | Lawlor et al. | |
| 7,324,261 | B2 | 1/2008 | Tonar et al. | |
| 7,338,177 | B2 | 3/2008 | Lynam | |
| 7,349,144 | B2 | 3/2008 | Varaprasad et al. | |
| 7,355,161 | B2 | 4/2008 | Romig et al. | |
| 7,360,932 | B2 | 4/2008 | Uken et al. | |
| 7,372,611 | B2 | 5/2008 | Tonar et al. | |
| 7,400,435 | B2 | 7/2008 | Byers et al. | |
| 7,446,924 | B2 | 11/2008 | Schofield et al. | |
| 7,467,883 | B2 | 12/2008 | DeLine et al. | |
| 7,602,542 | B2 | 10/2009 | Tonar et al. | |
| 7,626,749 | B2 | 12/2009 | Baur et al. | |
| 7,663,798 | B2 * | 2/2010 | Tonar et al. | 359/265 |
| 7,830,583 | B2 | 11/2010 | Neuman et al. | |
| 7,855,755 | B2 | 12/2010 | Weller et al. | |
| 7,864,398 | B2 | 1/2011 | Dozeman et al. | |
| 8,004,741 | B2 | 8/2011 | Tonar et al. | |
| 8,035,881 | B2 | 10/2011 | Luten et al. | |
| 8,335,032 | B2 | 12/2012 | McCabe et al. | |
| 8,503,061 | B2 | 8/2013 | Uken et al. | |
| 8,665,510 | B2 | 3/2014 | Uken et al. | |
| 8,917,437 | B2 * | 12/2014 | Baur et al. | 359/267 |
| 2006/0061008 | A1 | 3/2006 | Karner et al. | |
| 2011/0188122 | A1 | 8/2011 | Habibi et al. | |
| 2012/0038964 | A1 | 2/2012 | De Wind et al. | |

* cited by examiner

METHOD OF COATING A REAR GLASS SUBSTRATE FOR AN ELECTROCHROMIC MIRROR REFLECTIVE ELEMENT

CROSS REFERENCE TO RELATED APPLICATIONS

The present application is a continuation of U.S. patent application Ser. No. 13/959,036, filed Aug. 5, 2013, now U.S. Pat. No. 8,665,510, which is a continuation of U.S. patent application Ser. No. 13/262,091, filed Sep. 29, 2011, now U.S. Pat. No. 8,503,061, which is a 371 U.S. national phase filing of PCT Application No. PCT/US2010/029173, filed Mar. 30, 2010, which claims the benefit of U.S. provisional applications, Ser. No. 61/288,923, filed Dec. 22, 2009; Ser. No. 61/232,246, filed Aug. 7, 2009; Ser. No. 61/186,204, filed Jun. 11, 2009; and Ser. No. 61/164,593, filed Mar. 30, 2009, which are hereby incorporated herein by reference in their entireties.

FIELD OF THE INVENTION

The present invention relates to interior rearview mirror assemblies and, more particularly, to electro-optic or electrochromic reflective element assemblies and a method for manufacturing electro-optic or electrochromic reflective element assemblies.

BACKGROUND OF THE INVENTION

Automotive electrochromic mirror reflective element cell assemblies are known and typically include a front substrate and a rear substrate and an electrochromic medium sandwiched therebetween and contained within an interpane cavity. The front substrate typically includes a transparent conductive coating established at its rearward surface (the surface facing the rear substrate and the electrochromic medium) and the rear substrate typically includes a conductive coating (such as a metallic reflector coating or coatings and/or a transparent conductive coating or coatings) established at its front surface (the surface facing the front substrate and the electrochromic medium). Electrical connectors are provided, typically as metallic busbar clips that extend substantially along respective edges of the substrates, to provide electrical current to the conductive coatings to control the dimming or darkening of the electrochromic medium.

SUMMARY OF THE INVENTION

The present invention provides an electro-optic mirror reflective element assembly, such as an electrochromic mirror reflective element assembly that has electrical connectors for powering the cell or reflective element assembly that provide enhanced electrical connection and enhanced manufacturing processes, while reducing the costs associated with the assembly and construction of the mirror reflective element assembly. Optionally, the mirror reflective element assembly may comprise a third surface metallic reflector and may include a transmission-reducing thin film coating (such as a chrome/chromium coating and/or other suitable metallic coating or layer or the like) at the rear or fourth surface of the reflective element assembly.

These and other objects, advantages, purposes and features of the present invention will become apparent upon review of the following specification in conjunction with the drawings.

BRIEF DESCRIPTION OF THE DRAWINGS

FIG. 38 is a perspective view of another electrical connector for electrically connecting to a conductive coating of a reflective element assembly in accordance with the present invention, such as via establishing electrical conductive continuity to an electrically conductive coating on a front substrate of the reflective element assembly via a conductive epoxy or the like;

DESCRIPTION OF THE PREFERRED EMBODIMENTS

Figure 1:
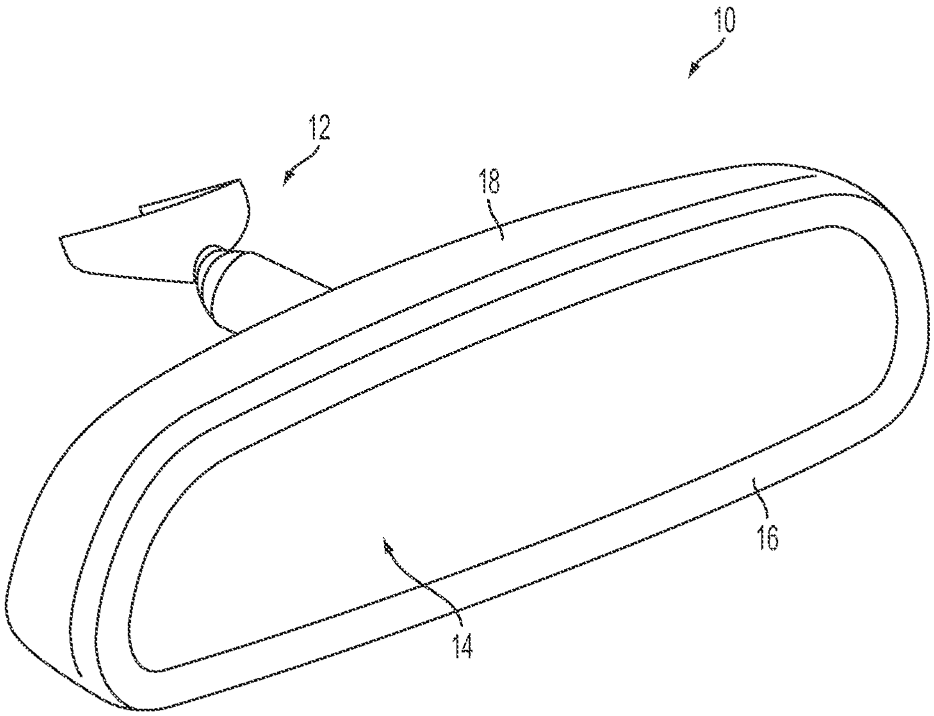
FIG. 1 is a perspective view of an interior rearview mirror assembly incorporating a reflective element assembly of the present invention.

Referring now to the drawings and the illustrative embodiments depicted therein, an interior rearview mirror assembly 10 is pivotally or adjustably mounted to an interior portion of a vehicle via an adjustable mounting assembly 12, such as via a double ball mounting or bracket assembly (FIG. 1). Mirror assembly 10 includes an electro-optic reflective element 14 (such as an electrochromic reflective element assembly), a bezel portion 16 and a housing or casing 18. The reflective element assembly 14 is electrically connected to a circuit element or circuitry (such as a printed circuit board or the like) that is electrically powered to control the dimming or darkening of the reflective element assembly 14, as discussed below.

Figure 3:
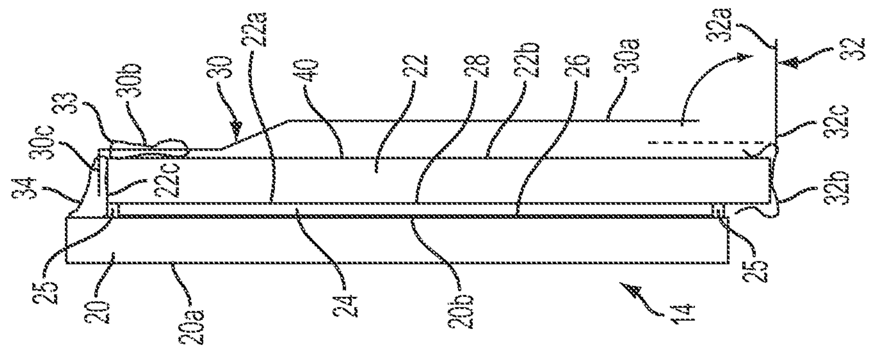
FIG. 3 is a side elevation and partial sectional view of the reflective element assembly of FIG. 2.
Figure 2:
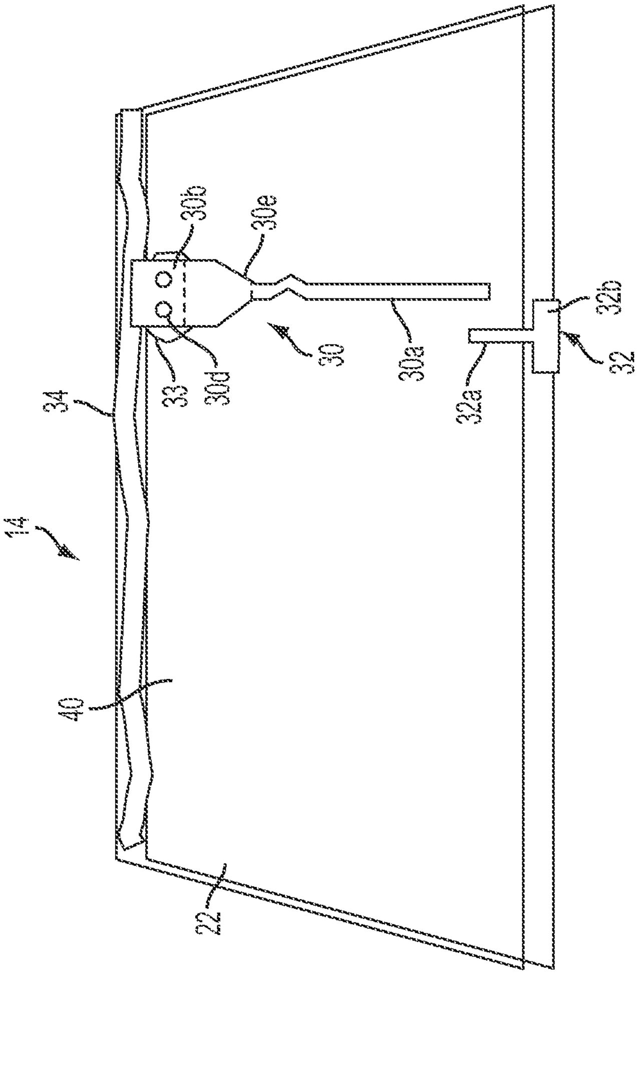
FIG. 2 is a perspective view of a reflective element assembly of the present invention.

As shown in FIGS. 2 and 3, the reflective element 14 includes a front substrate 20 and a rear substrate 22, with an electro-optic medium 24 (such as an electrochromic medium) disposed therebetween (and sealed or contained within the interpane cavity between the glass substrates 20, 22 via a perimeter seal 25). The front substrate 20 has a front or first surface 20*a* (that faces generally towards a driver of a vehicle when the mirror assembly is normally mounted in the vehicle) and a rear or second surface 20*b*, with a transparent conductive coating 26 (such as an indium tin oxide (ITO) coating or the like) established on second surface 20*b*, while the rear substrate 22 has a front or third surface 22*a* (facing the electro-optic medium disposed between the front and rear substrates) and a rear or fourth surface 22*b*, with a metallic reflector coating 28 (such as a transflective display-on-demand reflector coating that is partially transmissive of light therethrough and partially reflective of light incident thereon) established on third surface 22*a*. An electrical connector 30 is conductively connected to the transparent conductive coating 26 at second surface 20*b* of front substrate 20, and another electrical connector 32 is conductively connected to the metallic reflector coating 28 at third surface 22*a* of rear substrate 22, whereby electrical power is supplied to the coatings 26, 28 via connectors 30, 32 to vary the degree of dimming or darkening of the electro-optic medium 24.

Electrical connector 30 comprises a metallic element, such as a stamped metallic element or the like, having an elongated tab portion 30*a* extending from an attachment portion 30*b* and at least partially across the fourth surface 22*b* of rear substrate 22, and a connecting portion 30*c* extending from attachment portion and at least partially across an edge or edge dimension 22*c* of rear substrate 22. As can be seen in FIGS. 2 and 3, attachment portion 30*b* is attached to the fourth surface 22*b* of rear substrate 22, such as via an adhesive 33. Optionally, attachment portion 30*b* may include one or more apertures 30*d* to enhance the adhesion of the attachment portion 30*b* to the fourth surface 22*b* of rear substrate 22. Connecting portion 30*c* of electrical connector 30 is bent, such as about 90 degrees or thereabouts, relative to attachment portion 30*b* so as to extend at least partially across the edge dimension 22*c* of rear substrate 22.

As shown in FIG. 3, a conductive material 34 (such as a conductive epoxy or conductive paste or conductive potting material or the like) may be disposed at edge dimension 22*c* and at a corresponding overhang region of front substrate 20 so as to electrically conductively connect connecting portion 30*c* to the transparent conductive coating 26 at rear or second surface 20*b* of front substrate 20. The perimeter seal 25 may electrically isolate the conductive material 34 from the third surface reflector coating 28. For example, the third surface reflector coating 28 may be established at third surface 22*a* of rear substrate 22 and may not extend to the edge dimension 22*c* at least in the region of connecting portion 20*c* so as to electrically isolate reflector coating 28 from electrical connector 30. The conductive connection between the second surface transparent conductive coating 26 and the electrical connector 30 may utilize aspects of the reflective element assemblies described in U.S. Pat. Nos. 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, and/or U.S. provisional application Ser. No. 61/301,417, filed Feb. 4, 2010, which are hereby incorporated herein by reference in their entireties.

In the illustrated embodiment, and as can be seen in FIGS. 2 and 3, tab portion 30*a* of electrical connector 30 extends substantially across the rear surface 22*b* of rear substrate 22. Tab portion 30*a* may comprise a flexible or bendable tab that may flex at bend regions 30*e* to allow for bending of tab portion 30*a* away from the rear surface 22*b* of rear substrate 22 for connecting to a circuit element or printed circuit board, as discussed below.

Electrical connector 32 electrically conductively connects to the third surface conductive reflector coating 28. Electrical connector 32 includes a tab portion 32*a* and a connecting portion 32*b* that electrically and conductively connects to third surface reflector coating 28 at third surface 22*a* of rear substrate 22. In the illustrated embodiment, connecting portion 32*b* comprises a metallic clip (such as a flexible clip that clamps around the edge of the substrate) that receives and clips onto an edge region of the rear substrate at an overhang region of the rear substrate so as to establish electrical conductivity to the reflector coating 28. Optionally, and desirably, the third surface 22*a* may have a tab out conductive coating established thereon and at the region where the connecting portion 32*b* attaches or clips, with the tab out coating establishing electrical conductivity between a perimeter region of the third surface 22*a* and the reflector coating 28 established at the principal reflecting region of the reflective element inboard of the perimeter seal 25 (such as by utilizing aspects of the reflective element assemblies described in U.S. Pat. Nos. 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, which are hereby incorporated herein by reference in their entireties). Optionally, the connector 32 may be encapsulated to protect the mirror reflector coating or tab out coating or layer.

Thus, when assembled, the reflective element includes electrical connectors 30, 32, with the respective connector tabs 30*a*, 32*a* extending along the rear surface of the rear substrate 22. In the illustrated embodiment, the second surface electrical connector 30 extends substantially across the rear substrate, while the third surface reflector electrical connector 32 comprises a relatively short connector. However, the connectors may have different sizes and lengths without affecting the scope of the present invention.

The electrical connection to the second surface transparent conductive coating 26 may be made via electrical connector 30 and the conductive material or epoxy 34. For example, the connecting portion 30*c* may be inserted into uncured conductive epoxy established at the overhang region, whereby when the conductive epoxy cures, the connecting portion 30*c* of electrical connector 30 is secured therein and is electrically conductively connected to the second surface transparent conductive coating 26 at the second surface 20*b* of front substrate 20. At the time that the connecting portion 30*c* is inserted into the uncured conductive epoxy, the attaching portion 30*b* may be adhered to the fourth surface 22*b* of the reflective element assembly.

Figure 5:
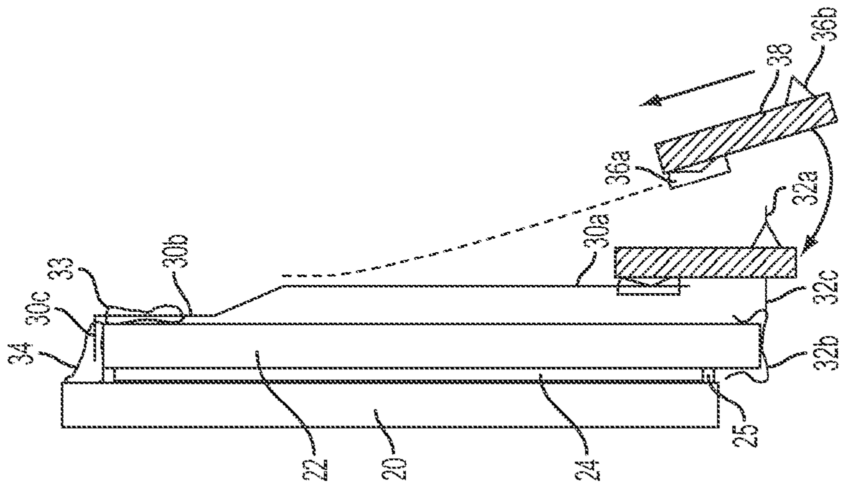
FIG. 5 is a side elevation and partial sectional view of the reflective element assembly of FIG. 4, showing the connection process of connecting the circuit board to the connectors.
Figure 4:
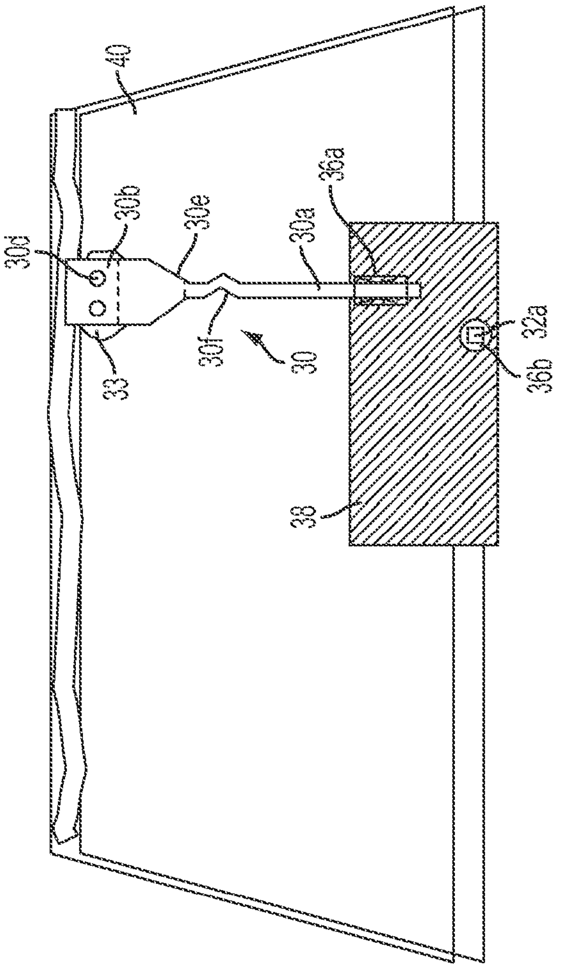
FIG. 4 is a perspective view of the reflective element assembly of FIG. 2, shown with a printed circuit board connected to the connectors.

When assembled, the tab portions 30*a*, 32*a* of the electrical connectors may be bent or formed to extend generally across or partially across the rear surface of the rear substrate. As shown in FIGS. 4 and 5, the tab portions 30*a*, 32*a* may be flexed or bent (such as at bend regions 30*e*, 32*c* to align the clips with connectors or receptacles 36*a*, 36*b* at a circuit element 38, such as a printed circuit board or the like with circuitry established on a substrate or chip. For example, and as shown in FIG. 5, tab portion 30*a* may be bent or flexed outward away from the rear surface 22*b* of rear substrate 22, and may be inserted into receptacle 36*a* at circuit element 38. When the tab portion 30*a* is received in receptacle 36*a*, the tab portion 32*a* of electrical connector 32 may be aligned with a second receptacle or connector 36*b* at circuit element 38. Optionally, for example, tab receptacle 36*a* may allow the end of the tab portion 30*a* to pass through to allow for additional positional tolerance and adjustability so as to assist an operator in aligning tab portion 32*a* with receptacle 36*b*. Optionally, the tab portion 30*a* may have a bend pattern 30*f* stamped or formed therealong to provide enhanced flexibility to allow for side-to-side positional tolerance and adjustability so as to assist an operator in aligning tab portion 32*a* with receptacle 36*b*.

Figure 6:
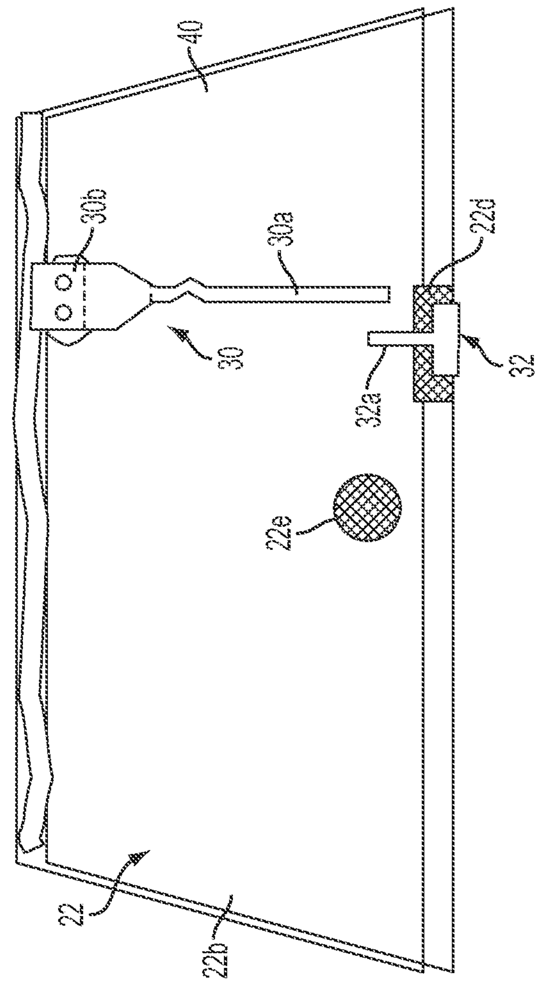
FIG. 6 is a perspective view of the reflective element assembly of FIG. 2, showing portions of the rear surface that may be masked prior to coating the rear surface of the reflective element assembly with a coating.

When the circuit element 38 is attached or connected to tab portion 30*a*, the receptacle or connector 36*b* of circuit element 38 may be generally aligned with tab portion 32*a* of electrical connector 32. As can be seen in FIG. 6, tab portion 32*a* may be bent or flexed so that it extends rearward and away from rear surface 22*b* of rear substrate 22, whereby the tab portion 32*a* may be received in and through receptacle 36*b* as the circuit element 38 (and tab portion 30*a*) is moved toward the rear surface of the reflective element. Thus, after the tab portion 30*a* is engaged with the receptacle 36*a* at circuit element 38, circuit element 38 can rotate towards the rear substrate 22 whereby the bent up or outwardly protruding tab portion 32*a* may plug into the receptacle 36*b* at circuit element 38 to complete the electrical connection of the circuit element to the electrical connectors 30, 32. Thus, the electrical connection and cell construction of the present invention provides a reduced cost construction and enhanced manufacturing and assembly processing for an electro-optic mirror reflective element assembly and its electrical connectors that connect to the conductive coatings or layers established at the second and third surfaces of the reflective element assembly.

Although shown and described as having a clip portion that clips around the perimeter edge of the rear substrate, it is envisioned that the electrical connector that connects to the third surface conductive coating or coatings may be attached to the rear or fourth surface of the rear substrate and reflective element, such as via a suitable adhesive or the like. For example, the tab out portion at the third surface may comprise a wraparound portion that wraps around the perimeter edge of the rear substrate to provide electrical continuity between the fourth surface and the third surface (such as by utilizing aspects of the mirror assemblies described in U.S. Pat. Nos. 7,400,435; 7,184,190 and/or 7,255,451, and/or U.S. patent application Ser. No. 11/226,628, filed Sep. 14, 2005, and published Mar. 23, 2006 as U.S. Publication No. US 2006/0061008; and/or Ser. No. 11/912,576, filed Oct. 25, 2007, now U.S. Pat. No. 7,626,749, and/or PCT Application No. PCT/US2007/082099, filed Oct. 22, 2007 and published May 2, 2008 as International Publication No. WO 2008/051910, which are hereby incorporated herein by reference in their entireties). The electrical connector may otherwise be similarly constructed as described above, and may flex or bend to align with a receptacle at the circuit element to electrically connect to the circuit element or board, such as in a similar manner as described above.

Optionally, the reflective element assembly 14 may include an opaque reflecting coating or layer or transmission-reducing thin film coating or layer 40, such as a chrome/chromium coating or layer or the like, established at the fourth or rear surface 22*b* of the rear substrate 22. The fourth surface opaque reflecting or transmission-reducing thin film coating or layer (or other suitable any light transmission-reducing film or layer or coating, such as a silicon layer or the like) may replace the opaque or black light mask tape and application equipment that is typically used to cover the rear surface of the reflective element to limit light passage from behind the reflective element and through the rear substrate of the reflective element. The opaque reflecting or transmission-reducing thin film coating or layer functions to limit light transmission through the rear substrate and also provides enhanced reflectivity of the mirror reflective element by providing a reflective coating behind the third surface partially reflective partially transmissive reflector coating at the third surface of the rear substrate. Although discussed as comprising a chrome/chromium coating or layer, the opaque or light transmission-reducing thin film or coating or layer may comprise any suitable material, such as chrome/chromium or silicon or chromium oxide or titanium or the like, and may or may not be reflective of light incident thereon, while remaining within the spirit and scope of the present invention.

The rear substrate may be masked during the opaque reflecting or transmission-reducing layer coating process (typically a vacuum-deposition process and preferably a vacuum-deposition sputtering process as is known in the thin film coating arts) so as to limit or substantially preclude depositing or establishing the opaque reflecting or transmission-reducing thin film layer in areas where it is not desired. For example, in order to electrically isolate the electrical connectors 30, 32, and as shown in FIG. 6, the rear substrate 22 may be masked at the region 22*d* where the electrical connector 32 connects or clips to the rear substrate so as to be devoid of the opaque reflecting or transmission-reducing thin film coating in that area to avoid shorting that may otherwise occur if electrical connector 32 and electrical connector 30 were both in contact with the opaque reflecting or transmission-reducing thin film coating (such as chrome/chromium or the like). Optionally, and as shown in FIG. 6, one or more other regions or areas 22*e* of the rear surface 22*b* of the rear substrate 22 may be masked, such as by using a fixed or movable mask in-chamber during a vacuum-deposition sputtering process, such as for a rearward facing photosensor location or the like (such as for a location at which a glare light sensor may be disposed to detect glare light rearward of the vehicle, such as for detecting headlamps of following vehicles, whereby the dimming or darkening of the electro-optic reflective element assembly may be responsive to such glare detection).

The masking of the substrate surface may be achieved via any suitable means, such as, for example, use of a clean removing tape, screen printing that washes off during the washing of the substrate following the opaque reflecting or transmission-reducing or chrome/chromium coating process, use of a clear ink that resists the chrome/chromium coating (and the clear ink may then remain on the substrate after the washing process), and/or the like. Although shown and described as masked areas for the electrical connector and a glare photosensor, clearly other areas or regions may be masked during the fourth surface chrome/chromium (or other metal) vacuum-deposition coating process, such as for a display-on-demand display device (such as a video display or the like) or for a rearward facing camera (such as for a cabin monitoring system or the like) or for any other accessory that would be suitable for use at a partially transmissive reflective element assembly.

The reflective element thus may a fourth surface thin film coating, preferably a sputtered metal thin film coating, such as a chrome/chromium coating (or other suitable opacifying coating or layer or material), that has low light transmission (preferably less than 1 percent visible light transmission, more preferably less than about 0.5 percent visible light transmission) with one or more light transmitting windows established through the fourth surface metal thin film coating. Thus, the transflective mirror reflector disposed on the third surface of the mirror reflective element provides a display on demand or transflective mirror reflective element at the light transmitting windows (with the reflective element at the window regions being at least partially transmissive of light therethrough, while being substantially limiting to transmission of light through the mirror reflective element where the fourth surface opaque layer or coating is disposed at the fourth surface). However, the outline of the sensor hole or aperture or window in the fourth surface metal thin film coating may be visible or discernible when the mirror assembly is normally mounted in a vehicle equipped with the mirror assembly and the reflective element assembly is normally viewed by the driver of the equipped vehicle. Such a discernibility of the window (and/or of the presence of a sensor or display or the like disposed thereat and therebehind) may be due to the visible contrast ratio (as visibly discernible in reflection by a driver normally viewing the mirror as mounted in the equipped vehicle) between the metal thin film coated area and the taped or masked portion or window area. For example, if the fourth surface metal thin film coating on the fourth surface of the reflective element has a reflectance of about 40 percent of light incident thereon and the rear surface of the glass substrate at its uncoated window area has a reflectance of about the 4 percent of light incident thereon, then the visibly discernible contrast ratio is about ten to one. Optionally, the masking and windows may be accomplished in a manner to reduce the contrast ratio or otherwise reduce the discernibility of the window established through the fourth surface metal thin film coating.

For example, the visibly discernible contrast (between the window area of the substrate and the fourth surface metal thin film coated area of the substrate surrounding an adjacent window formed therethrough) may not be as noticeable or discernible (when incorporated into an interior rearview mirror assembly construction such as described above and when normally viewed by a driver of an equipped vehicle) if the edges of the metal thin film coating surrounding/adjacent the window established in the fourth surface metal thin film coating are rendered non-sharp (such as by tapering the physical thickness of the metal thin film coating, with the tapering comprising, for example, a gradation or reduction in thickness from the physical thickness of the coating at the fourth surface to about a zero thickness dimension at the window area, which may be devoid of the fourth surface metal thin film material or layer) rather than a steep or sudden change caused by the likes of use of a sharply defined masking tape or mask edge to establish the window in the fourth surface metal thin film coating at the fourth surface during its vacuum-deposition, typically during a vacuum-deposition sputter coating process. Optionally, the reflectance of the fourth surface metal thin film surrounding and immediately adjacent the uncoated glass surface constituting the window, as seen through the reflective element, can be rendered non-uniform by using a raised mask (used during vacuum-deposition of the fourth surface metal thin film at the fourth or rear surface of the rear substrate) that is raised above or spaced from the rear surface of the rear substrate, whereby a shadow generated by the mask establishes a tapered coating thickness and varying or non-uniform reflectance at the transition area between the outer edges of the masked area or window area toward the center of the sensor window. Optionally, the reflectance can be rendered non-uniform by using an index matching adhesive and a backing film (such as a metalized Mylar backing film or the like) to reduce the contrast. The photosensor can be embedded in such a metalized film with an adhesive (such as a pressure sensitive adhesive or the like) that attaches to the substrate at the sensor window that is established through the metal thin film coating. Optionally, the fourth surface metal thin film coating, such as a chrome/chromium coating, may have a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, to taper the coating thickness at the transition region or to vary or render non-uniform the reflectance or contrast at the transition region, some of the metal thin film coating may be removed at the edges of the window to taper the coating thickness by removing more metal thin film closer to the sensor window and less away from the sensor window. The sensor hole or aperture or window thus may be less noticeable or less visibly discernible to a driver of the equipped vehicle when normally viewing the reflective element as normally mounted in the equipped vehicle, because the percent transmissivity and percent reflectance of the metal thin film layer gradually changes at the edge regions of the window so that there is not a sharp change in contrast at the perimeter edges of the window. The aspects of the present invention, as exemplified above, where the likes of a photosensor is disposed behind and at the subject hole or aperture of the coating of the rear substrate, may be further applicable to the likes of a third surface coating and/or disposition of the likes of a display or other element to the rear of the fourth surface of the reflective element and at and viewing through or emitting light through such an aperture or hole or window established through the third surface coating and/or the fourth surface coating.

Figure 25:
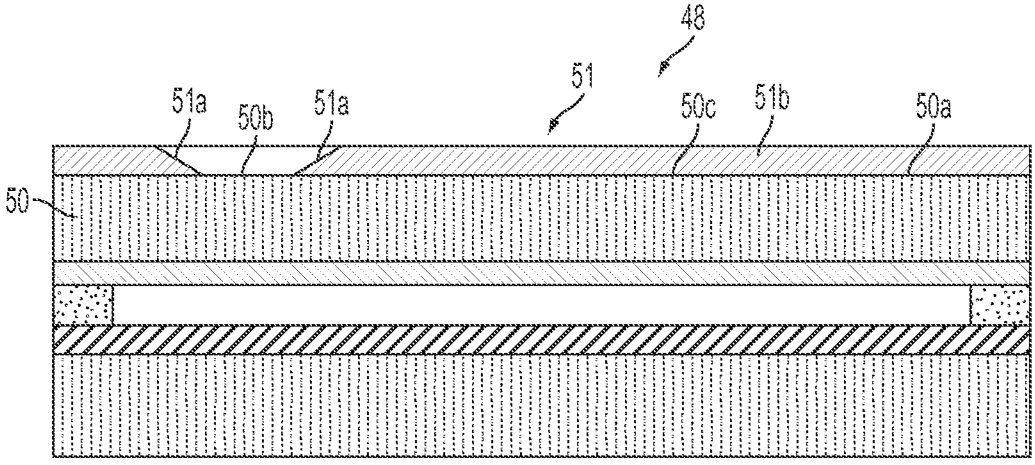
FIG. 25 is a sectional view of a reflective element assembly in accordance with the present invention.

For example, and with reference to FIG. 25, a reflective element assembly 48 has a rear substrate 50 with an at least substantially opaque metal thin film 51 disposed at a rear surface 50*a* of rear substrate 50. The fourth surface metal thin film or coating 51 has a window or aperture established therethrough at a window region 50*b* of the rear substrate 50, where the rear surface 50*a* of rear substrate 50 is substantially devoid of the metal thin film 51 at the window region 50*b*. A transition portion 51*a* of the metal thin film 51 surrounds and is adjacent to the window region 50*b* and provides a non-sharp transition between the substantially uncoated window region 50*b* and a fully coated/higher and uniformly reflective rear surface region 50*c*, where the rear surface 50*a* of rear substrate 50 is coated by a generally uniform thickness mirror coating portion 51*b* of metal thin film 51 (which may have a physical thickness over substantially the entire rear surface that is at least about 300 angstroms, and more preferably at least about 500 angstroms and more preferably at least about 700 angstroms, except at and around the window area and transition portion). In the illustrated embodiment, transition portion 51*a* of metal thin film 51 has a varying or tapered thickness so as to provide a non-uniform reflectance at the transition portion or region circumscribing or surrounding the window region and a non-sharp change in reflectance between the light transmitting window region 50*b* of the rear substrate 50 and the highly reflecting coated region 50*c* of the rear substrate (the area at which the generally uniform thickness metal thin film coating portion 51*b* is disposed). Optionally, although shown as having a tapered thickness of the metal thin film layer surrounding the hole or window, it is envisioned that other means for rendering the reflectance at the transition region non-uniform may be implemented, such as, for example, a gradient or fuzzy or irregular or non-uniform metal thin film deposition at the border area immediately adjacent and around the hole or window, while remaining within the spirit and scope of the present invention.

Thus, the present invention provides a vehicular reflective element assembly that has a window established through a transmission-reducing thin film coating at the fourth or rearmost surface of the reflective element, with the window region being substantially devoid of the thin film coating at a location where a sensor is disposed behind the reflective element and having a field of view through the reflective element and through the window. A portion of the transmission-reducing thin film coating at and around and circumscribing the window locally varies in physical thickness, with a minimum physical thickness of the thin film coating being closest to the window and with the physical thickness of the thin film coating generally increasing to a generally maximum physical thickness of the thin film coating at a distance from the window (and with the generally maximum physical thickness of the thin film coating corresponding with the physical thickness of the thin film coating that is disposed at substantially the rest of the rear surface remote from the window region). For example, the transition portion or tapering portion of the thin film coating between the minimum physical thickness portion and the generally maximum physical thickness portion may extend a distance of between about 1 mm and 20 mm or thereabouts from the window, or between about 2 mm and 15 mm or thereabouts from the window, or between about 3 mm and 10 mm or thereabouts from the window, and thus providing a gradual change in the physical thickness of the fourth surface thin film coating so that the window is not readily discernible by a person viewing the mirror reflective element when the mirror assembly is normally mounted in a vehicle. Although it is referenced above as having a generally uniform thickness, clearly the transmission-reducing thin film coating that is disposed at the rear surface of the reflective element away from the transition region and the window may have variations in its physical thickness, while remaining within the spirit and scope of the present invention.

By affirmatively rendering non-sharp the transition between the lower reflectance in the window/non-coated area (typically around 4 percent or thereabouts) and the higher reflectance of the immediately adjacent and surrounding area coated by the fourth surface metal thin film coating (typically having a reflectance of at least about 40 percent, often at least about 50 percent), the discernibility of the window established through the fourth surface metal thin film to a driver viewing the completed mirror assembly (where the second or rear substrate forms an element of the reflective element of the mirror assembly) is reduced. It has been found that this can be achieved by affirmatively rendering non-sharp the transition region surrounding the window, and this may be achieved in a variety of transition coating or deposition means. For example, it has been found that if the region surrounding and immediately adjacent to the window (typically the region within about 2 mm of the window and up to about 5 mm or more from the window) is rendered non-uniform in reflectance compared to the rest of the fourth surface reflective metal thin film coating, so that the transition from the highly reflecting fourth surface metal thin film coating to the lower reflecting (such as about 4 percent reflecting) bare glass at the window is non-uniformly reflecting and non-sharp, the discernibility of the window may be substantially reduced.

To achieve this, for example, the non-sharp, such as tapered, coating thickness or varying or non-uniform reflectance of the fourth surface opaque coating may be established at the transition region by a masking element that is at least partially spaced from the window region to allow for partial coating of at least a perimeter region of the window region. For example, and with reference to FIGS. 17-20, a mirror substrate 50 may be coated (on a surface of the substrate that will be the fourth surface or rear surface of the reflective element assembly or mirror cell) with a substantially opaque coating or metal thin film layer, such as a chrome/chromium coating or layer (or other suitable opacifying layer or coating or material) and, during the vacuum-deposition coating of the metal thin film at the rear surface of the mirror substrate, a raised masking element 52 may be disposed at the surface 50*a* of the substrate 50 at the location of a window for a sensor or the like. Raised masking element 52 includes a base portion or smaller diameter or smaller profile contacting portion 52*a* that contacts and masks a window portion or region or area of the substrate during the coating process. Masking element 52 also includes a larger diameter or larger profile portion 52*b* at an opposite end of the masking element from the substrate. Thus, the masking element 52 provides a "mushroom-shaped" or "umbrella-shaped" masking element that covers or encompasses a window portion or region and a transition portion or region of the substrate during the coating process (such as during the vacuum-deposition or sputter coating of the metal thin film onto the rear substrate surface) and establishes a light transmitting window through the coating where the base or contacting portion 52*a* contacts the substrate surface during the coating process. The wider or larger portion 52*b* of masking element 52 (that is spaced from the substrate surface) limits direct, non-scattered, line-of-sight deposition of the coating material onto the substrate surface in the transition region immediately surrounding the base portion of the masking element and beneath the larger diffusing portion, while allowing some of the metal thin film material to be deposited in the transition region so as to establish a tapered material thickness of the deposited metal thin film or opaque material around the window.

The masking element thus functions to establish a non-uniform or non-sharp or gradient reflectance or coating or tapered coating around the window, such that the window is not as readily distinguishable or discernible to a person viewing the reflective element. Thus, rather than a conventional masking element that establishes a sharp edge window through the substrate coating, the present invention provides a coating or reflectance gradient or non-uniform reflectance or shadowing or "fuzziness" around the perimeter of the light transmitting window. The masking element may be retained in place at the substrate surface via any suitable retention means, such as adhesive or bridge-type masking elements or spring-loaded retaining mechanisms to urge the contacting portion of the masking element into engagement with the substrate surface or otherwise hold the masking element at or near the substrate surface, such as by utilizing aspects of the masking systems described in U.S. Pat. No. 7,255,451, which is hereby incorporated herein by reference in its entirety.

Optionally, and with reference to FIGS. 21-24, a masking element 152 extends from a bracket or support 154 of a substrate holding fixture 156 that supports one or more mirror substrates 150 during the sputter coating or vacuum-deposition process (such as during a one-sided or two-sided sputter-up or sputter-down vacuum-deposition process). Thus, the masking element 152 may be built into or incorporated into the substrate fixture, thereby enhancing the masking process. The holding fixture 156 may receive one or more substrates in respective holding or receiving portions of the fixture, and the bracket 154 may be placed over the fixture to retain the substrates in the fixture and to provide the masking element at or near the substrate surface. The fixture (with substrates and bracket) may then be placed in a vacuum-deposition chamber for coating one or both surfaces of the substrate.

As can be seen in FIGS. 21-24, when the mirror substrate 150 is supported by the substrate holding fixture 156 and the masking element 152 extends over a surface 150*a* of the respective substrate 150, the masking element is disposed over or spaced from the substrate surface so that the masking element provides a gradient coating or tapered thickness coating around the perimeter of the window established through the coating or layer on the substrate surface and at the transition region between the light transmitting window and the higher reflecting area at which the metal thin film coating is disposed. Optionally, the window region may have some amount of the coating material deposited over the entire window region, with a reduced amount at the central region of the window and a gradually thickening amount or tapered amount surrounding the slight or partial or reduced coating at the central region (so as to provide non-uniform reflectance or a reflectance gradient entirely across or substantially entirely across the window region). Optionally, if it is desired to remove any coating material that may be deposited at the central region of the window, the coating process may be followed by a laser ablation process or step of an etching process or step to locally remove the coating material from the central region of the window, while leaving the reflectance gradient or tapered coating at the transition area around the perimeter of the ablated or etched window.

In the illustrated embodiment, masking element 152 includes a stalk or arm portion 152*a* and a window establishing portion 152*b*. The window establishing portion 152*b* is sized to be large enough that, when spaced from the substrate surface a desired or appropriate or selected amount, the coating material may be partially disposed at the area of the substrate surface at which the window establishing portion 152*b* is located, but will be substantially not disposed or deposited at a central region of the area at which the window establishing portion 152*b* is located, thereby providing a tapered coating or reflectance gradient or non-uniform reflectance at the transition area at least partially surrounding the light transmitting window. The width of the arm portion 152*a* is preferably thin enough so that the coating is deposited over the substrate surface substantially entirely beneath and along the arm portion 152*a* during the coating process. Thus, the coated substrate has a window formed through the fourth surface metal thin film coating with a tapered thickness coating around the perimeter of the window, while the region of the substrate beneath the arm portion is substantially uniformly coated or at least coated in a manner that any difference in coating thickness or reflectance in that area is not readily discernible by a person viewing the mirror reflective element. Optionally, the masking element and/or bracket and/or substrate support fixture may utilize aspects of the masking systems described in U.S. Pat. No. 7,255,451, which is hereby incorporated herein by reference in its entirety.

Thus, a glass mirror substrate (such as a rear substrate for an electrochromic reflective element assembly) may be shape-cut and coated via a vacuum-deposition or sputter coating process (such as a top-down and/or bottom-up coating process that may coat one or both sides or surfaces of the substrate). Optionally, an opacifying layer or coating (such as, for example, a metal thin film or a non-conductive coating, such as a silicon-based semiconductive coating or the like, such as a silicon-aluminum coating or the like) may be coated or applied on a substrate. The substrate may be supported in a fixture and one or more masking elements may be disposed thereat (such as via a spring-loaded masking support or a stick-on pad or a magnetic masking element or the like, and such as by utilizing aspects of the masking elements and systems described in U.S. Pat. No. 7,255,451, which is hereby incorporated herein by reference in its entirety), whereby the masking elements may be removed after the coating process.

The front or third surface of the rear substrate may be coated with a transflective mirror reflector coating (such as a stack of multiple coatings such as described in U.S. Pat. Nos. 7,274,501; 7,255,451; and/or 7,184,190, which are hereby incorporated herein by reference in their entireties), while the rear or fourth surface may be coated or at least partially covered with an opacifying layer or coating with a window established at areas where a sensor or the like may be disposed behind the reflective element. If the window is established with a sharp edge, the window edge may be discernible in high lighting conditions (and the covertness of the window and thus of the sensor or the like disposed therebehind may be compromised). Thus, the present invention provides a gradient reflectance coating or tapered coating or a degree of shadowing around the perimeter edge of the window. Optionally, the coatings may be deposited on both substrate surfaces in a common vacuum-deposition process and/or in a common vacuum chamber. Optionally, an opacifying tape need not be disposed at the rear surface, and a low cost tape or film (such as a scatterproofing/shatterproofing hot melt layer formed from R101, a styrene butadiene rubber (SBR) polymer sold by Helmitin GmbH of Pirmasens, Germany, and adhered to the rear surface to prevent scattering of glass fragments and shards in the event of glass breakage during an accident or the like, such as described in U.S. Pat. Nos. 7,467,883 and/or 5,521,760, which are hereby incorporated herein by reference in their entireties) may be used to limit or substantially preclude shattering of the substrate. Thus, the present invention provides a reduced cost substrate coating process that provides enhanced covertness of a window at a rear surface for a sensor or the like to view through.

Optionally, such a fourth surface metal thin film coating (such as a chrome/chromium coating or the like) may not be needed, such as for a low cost or base electro-optic mirror reflective element assembly. For such a mirror reflective element assembly, there may not be a display device or video display or compass display or the like, so there may not be the same concerns with light generated by a display device being seen through the reflective element at locations remote from the display area. Thus, in such a base or non-mirror-display embodiment, the back lighting concerns may be limited to concerns with light (such as ambient light) coming from or originating due to an opening in the back of the mirror housing (such as an opening for a wire or a channel mount or the like), which may be sealed to limit or substantially preclude light entry into the mirror casing. Also, in such a lower cost base embodiment, the third surface transflective reflector coating may be partially transmissive, but may only need to be transmissive enough for a glare sensor (with its rearward field of view through the mirror reflective element assembly and through the third surface transflective reflector) to be functional, and may only need to be transmissive of light therethrough that is in the wavelength region that the photosensor has its peak sensitivity (typically a higher wavelength region, such as at an infrared or near-infrared range of the spectrum). Thus, a higher reflectivity, lower transmissivity third surface mirror reflector may be utilized on a base mirror reflective element assembly that does not include a display on demand type of display behind and viewable through the electro-optic or electrochromic mirror reflective element or mirror cell.

Figure 8:
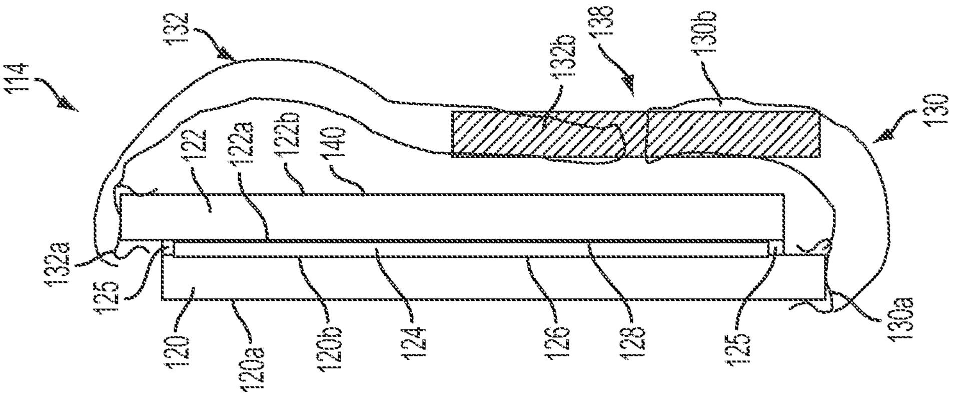
FIG. 8 is a side elevation and partial sectional view of the reflective element assembly of FIG. 7.
Figure 7:
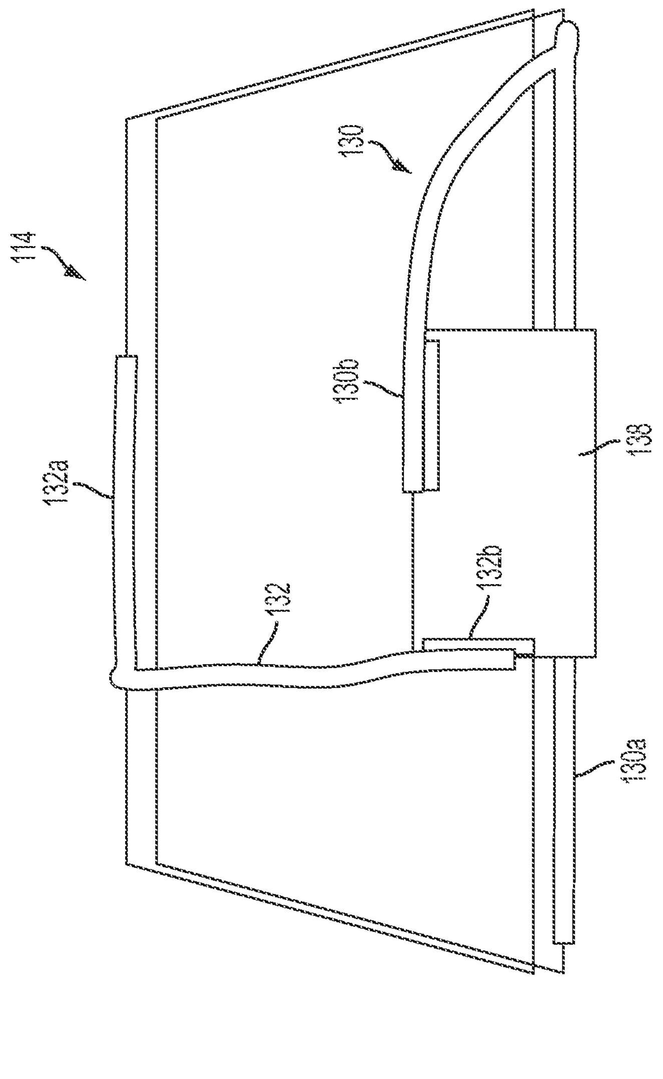
FIG. 7 is a perspective view of another reflective element assembly of the present invention.

Optionally, and with reference to FIGS. 7 and 8, a mirror reflective element assembly 114 includes a front substrate 120 and a rear substrate 122, with an electro-optic medium 124 (such as an electrochromic medium) disposed therebetween (and sealed or contained within the interpane cavity between the substrates 120, 122 via a perimeter seal 125). The front substrate 120 has a front or first surface 120*a* and a rear or second surface 120*b*, with a transparent conductive coating 126 established on second surface 120*b*, while the rear substrate 122 has a front or third surface 122*a* and a rear or fourth surface 122*b*, with a metallic reflector coating 128 established on third surface 122*a* (and optionally a chrome/chromium material or coating or other opaque reflective coating 140 established at the fourth surface 122*b*), such as in a similar manner as discussed above. An electrical connector 130 is conductively connected to the transparent conductive coating 126 at second surface 120*b* of front substrate 120, and another electrical connector 132 is conductively connected to the metallic reflector coating 128 at third surface 122*a* of rear substrate 122, whereby the electrical connectors are connected to a circuit element 138, such as a printed circuit board or the like, and electrical power is supplied to the coatings 126, 128 via connectors 130, 132 to vary the degree of dimming or darkening of the electro-optic medium 124.

In the illustrated embodiment, electrical connectors 130, 132 comprise elongated electrode clips, with one end portion 130*a*, 132*a* that clips over and along a perimeter edge region of the front and rear substrates 120, 122, respectively, and another end portion 130*b*, 132*b* that clips over and along a respective perimeter edge region of the circuit element 138. The clips or connectors 130, 132 may clip to the respective edges of the substrates as shown in FIG. 8, and may be bent or curved to extend away from the clipped edge region and toward the circuit element or circuit board 138. The end portions or clips 130*b*, 132*b* may be readily moved to generally align with an edge region of the circuit board and may be clipped thereto (such as by manually pressing the clips onto the circuit board or substrate), whereby electrical continuity is established between circuitry on the circuit element or board 138 (such as copper and/or solder exposed on the top and/or bottom of the circuit board that is conductively connected to appropriate circuitry) and the respective conductive coatings 126, 128 on the substrates 120, 122. In such an embodiment, the circuit board substrate and the coated glass substrates may have similar thicknesses (such as, for example, a thickness dimension of about 1.6 mm or thereabouts), so that the clip portions 130*a*, 130*b* and 132*a*, 132*b* may comprise continuous clip portions and thus may not include wires or other connectors attached to and extending between clip portions 130*a*, 130*b* or 132*a*, 132*b*.

Figure 9:
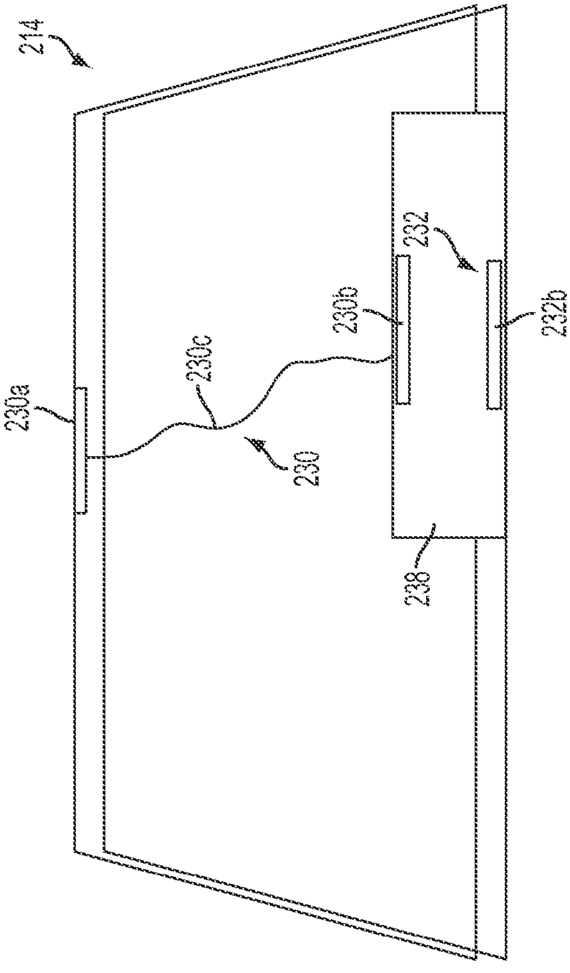
FIG. 9 is a perspective view of another reflective element assembly of the present invention.
Figure 10:
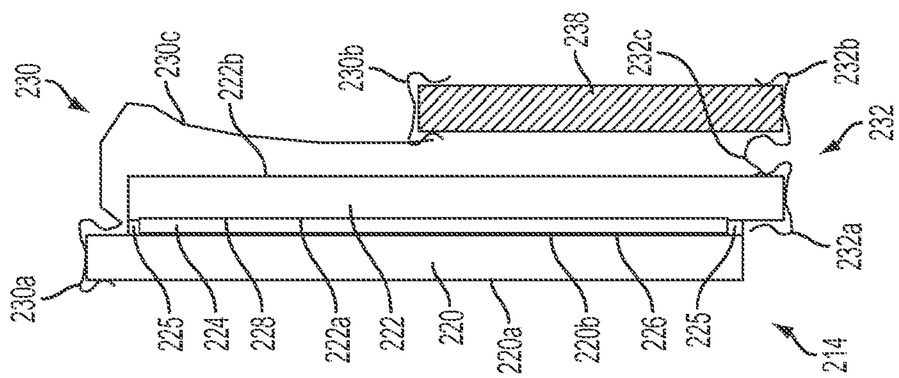
FIG. 10 is a side elevation and partial sectional view of the reflective element assembly of FIG. 9.

Optionally, and with reference to FIGS. 9 and 10, a mirror reflective element assembly 214 includes a front substrate 220 and a rear substrate 222, with an electro-optic medium 224 (such as an electrochromic medium) disposed therebetween (and sealed or contained within the interpane cavity between the substrates 220, 222 via a perimeter seal 225). The front substrate 220 has a front or first surface 220*a* and a rear or second surface 220*b*, with a transparent conductive coating 226 established on second surface 220*b*, while the rear substrate 222 has a front or third surface 222*a* and a rear or fourth surface 222*b*, with a metallic reflector coating 228 established on third surface 222*a* (and optionally a chrome/chromium material or coating or other opaque reflective coating established at the fourth surface 222*b*), such as in a similar manner as discussed above. An electrical connector 230 is conductively connected to the transparent conductive coating 226 at second surface 220*b* of front substrate 220, and another electrical connector 232 is conductively connected to the metallic reflector coating 228 at third surface 222*a* of rear substrate 222, whereby the electrical connectors are connected to a circuit element 238, such as a printed circuit board or the like, and electrical power is supplied to the coatings 226, 228 via connectors 230, 232 to vary the degree of dimming or darkening of the electro-optic medium 224.

Figure 12:
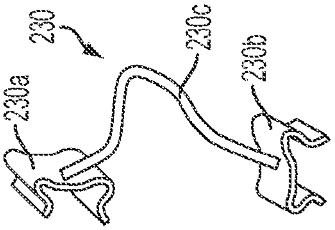
FIG. 12 is a perspective view of an electrical connector for electrically connecting to another edge of a substrate of the reflective element assembly and to the circuit element or board of the reflective element assembly.

In the illustrated embodiment, and as shown in FIGS. 10 and 12, electrical connector 230 comprises a pair of electrode clips 230*a*, 230*b* and an electrically conductive wire or lead 230*c* connected to the clips 230*a*, 230*b*. The clips 230*a*, 230*b* may be crimped onto the ends of the wire 230*c* or otherwise connected to the wire (such as via solder or the like). As shown in FIG. 10, one of the electrode clips 230*a* may clip over and along a perimeter edge region of the front substrate 220, while the other clip 230*b* may clip over and along a perimeter edge region of the circuit board 238, with the wire or lead 230*c* extending therebetween and allowing for flexibility in the connection process.

Figure 11A:
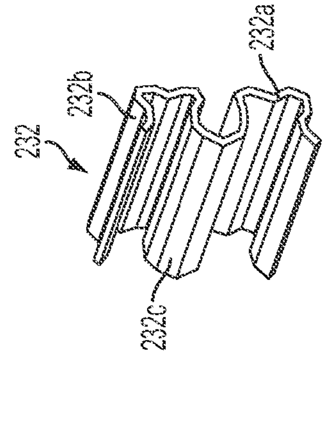
FIGS. 11A and 11B are perspective views of an electrode clip for electrically connecting to an edge of a substrate of the reflective element assembly and to a circuit element or board of the reflective element assembly.
Figure 11B:
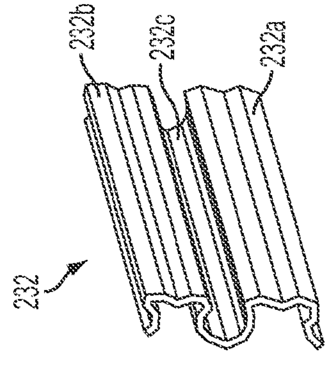

As shown in FIGS. 10, 11A and 11B, electrical connector 232 comprises a unitary metallic dual electrode clip, with a pair of clip portions 232*a*, 232*b* connected together by an intermediate web or connecting portion 232*c*. As shown in FIG. 10, one clip portion 232*a* may be connected or clipped to a perimeter edge region of the rear substrate 222, while the other clip 232*b* may be clipped over and along a perimeter edge region of the circuit board 238. In such an embodiment, the circuit board substrate and the coated glass substrates may have similar thicknesses (such as, for example, a thickness dimension of about 1.6 mm or thereabouts), so that the clip portions 230*a*, 230*b* and 232*a*, 232*b* may comprise common clip portions or designs or configurations. Optionally, the electrical connector 232 may be provided with different sized center connecting portions 232*c* to accommodate different sized cells or circuit elements or circuit board mounting configurations or the like.

Thus, an operator assembling the reflective element assembly may readily clip the clip portion 230*a* of electrical connector 230 to the front substrate 220 and the clip portion 230*b* to the circuit board 238 (such as by manually pressing the clips onto the front substrate and the circuit board). The clip portion 232*a* of electrical connector 232 may be clipped to the rear substrate 222, and then the circuit element 238 (with clip portion 230*b* already clipped thereto) may be readily moved toward and received in the clip portion 232*b* so as to establish electrical continuity between circuitry on the circuit element or board 238 (such as copper and/or solder exposed on the top and/or bottom of the circuit board that is conductively connected to appropriate circuitry) and the respective conductive coatings 226, 228 on the substrates 220, 222. Optionally, an operator may make the electrical connections in any other order, while remaining within the spirit and scope of the present invention. Optionally, and desirably, the clip 232*a* may be pressed onto the rear substrate and the clip and tab out portion at the third surface may be encapsulated.

Figure 14:
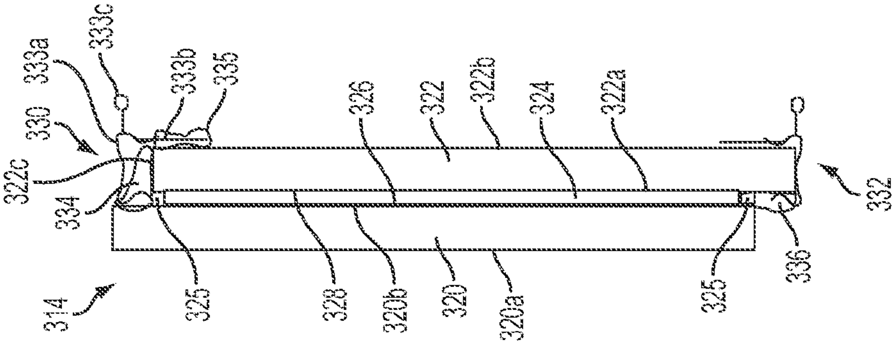
FIG. 14 is a side elevation and partial sectional view of the reflective element assembly of FIG. 13.
Figure 13:
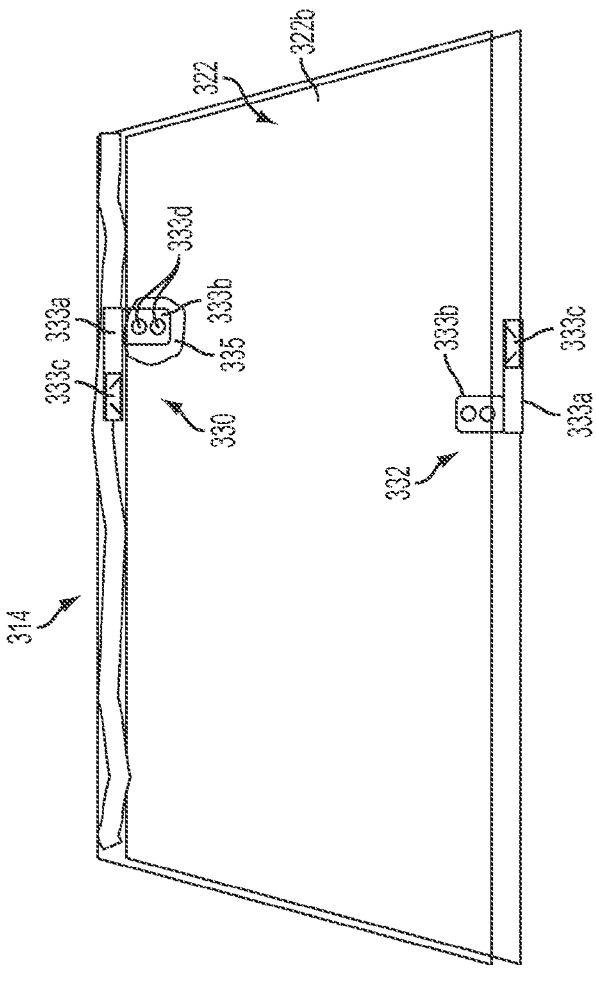
FIG. 13 is a perspective view of another reflective element assembly of the present invention.

Optionally, and with reference to FIGS. 13 and 14, a mirror reflective element assembly 314 includes a front substrate 320 and a rear substrate 322, with an electro-optic medium 324 (such as an electrochromic medium) disposed therebetween (and sealed or contained within the interpane cavity between the substrates 320, 322 via a perimeter seal 325). The front substrate 320 has a front or first surface 320*a* and a rear or second surface 220*b*, with a transparent conductive coating 326 established on second surface 320*b*, while the rear substrate 322 has a front or third surface 322*a* and a rear or fourth surface 322*b*, with a metallic reflector coating 328 established on third surface 322*a* (and optionally a chrome/chromium material coating or other opaque reflective coating established at the fourth surface 322*b*), such as in a similar manner as discussed above. An electrical connector 330 is conductively connected to the transparent conductive coating 326 at second surface 320*b* of front substrate 320, and another electrical connector 332 is conductively connected to the metallic reflector coating 328 at third surface 322*a* of rear substrate 322, whereby the electrical connectors are connected to a circuit element (not shown in FIGS. 13 and 14), such as a printed circuit board or the like, and electrical power is supplied to the coatings 326, 328 via connectors 330, 332 to vary the degree of dimming or darkening of the electro-optic medium 324.

Figure 15:
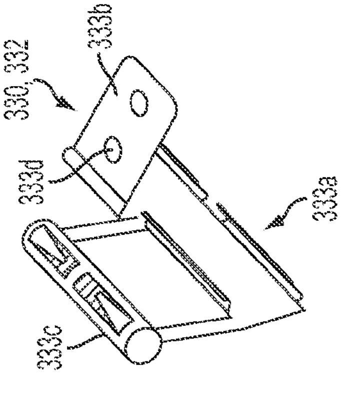
FIG. 15 is a perspective view of an electrical connector for electrically connecting to a conductive coating of the reflective element assembly of FIGS. 13 and 14.
Figure 17:
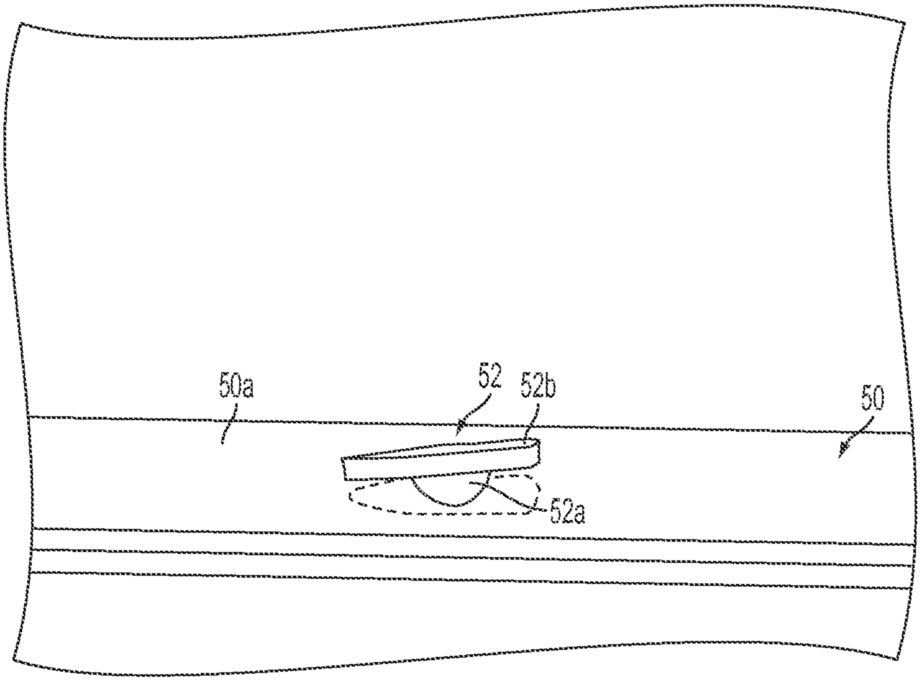
FIGS. 17-20 are views of a masking element that is disposed at a surface of a mirror substrate during a coating process in accordance with the present invention.
Figure 18:
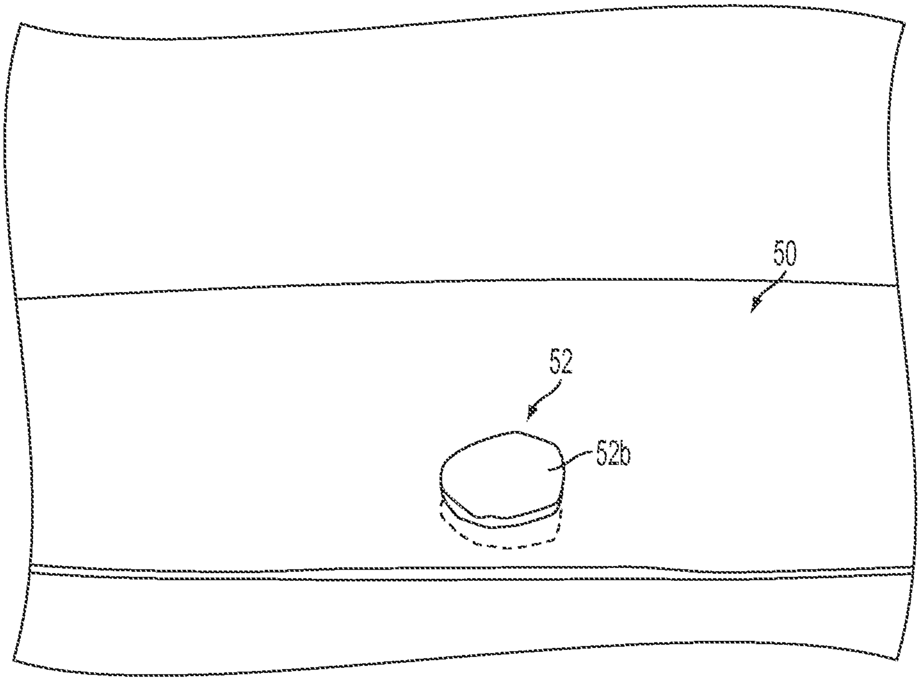
Figure 19:
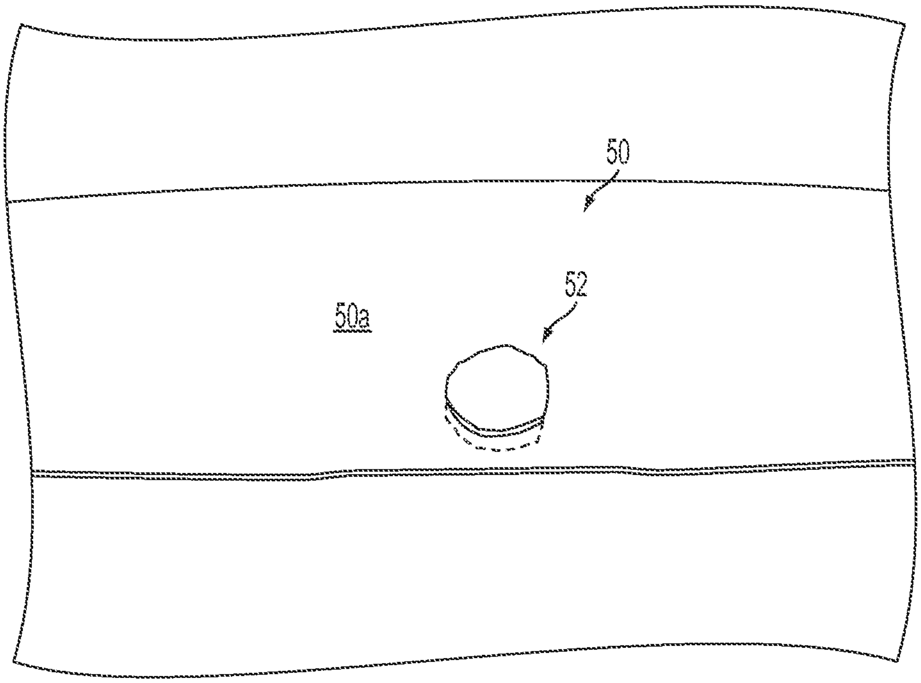
Figure 20:
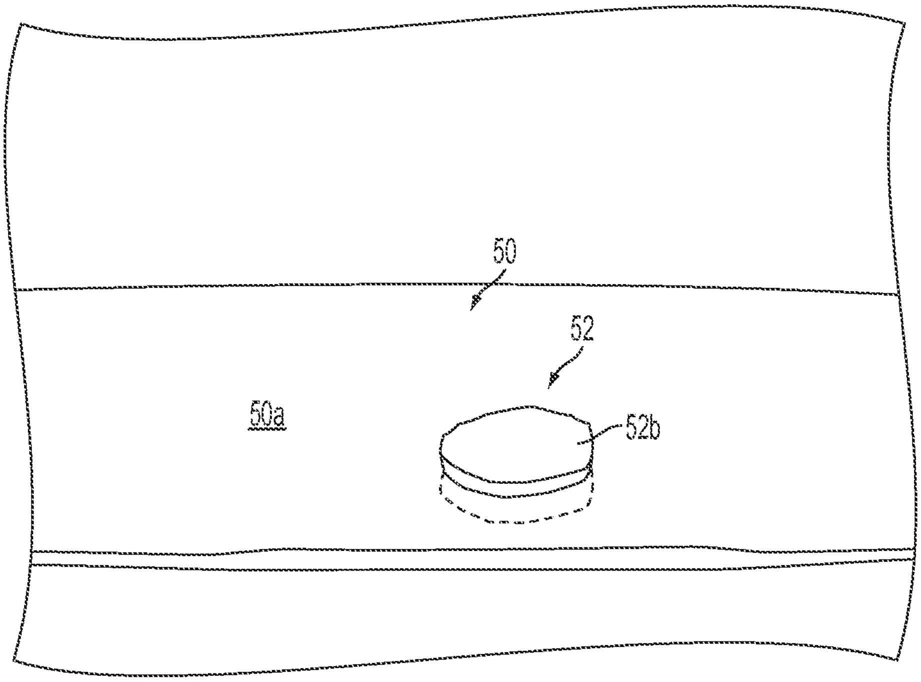
Figure 21:
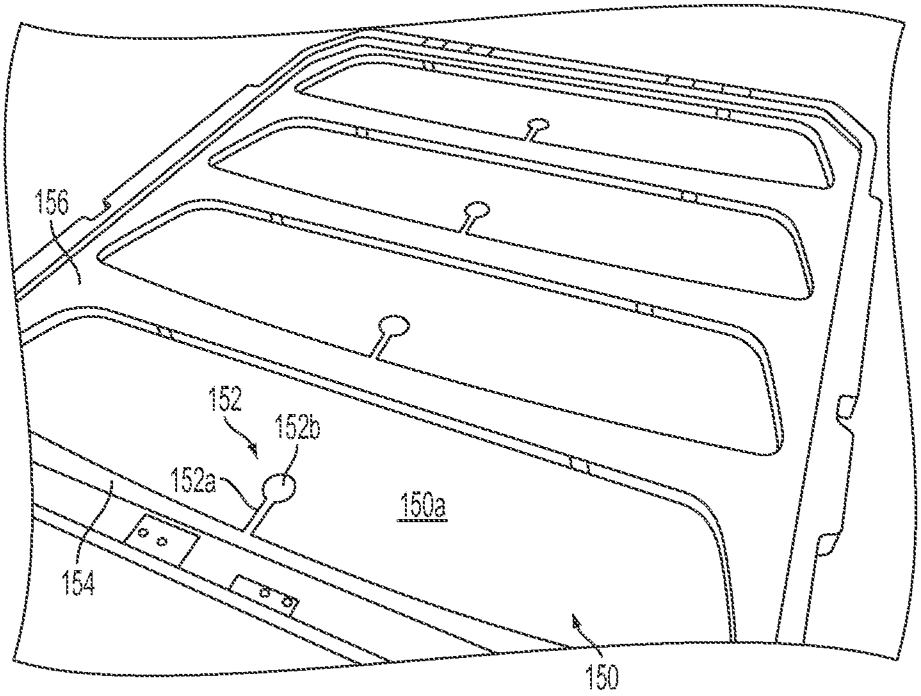
FIGS. 21-24 are views of another masking element that is disposed at a surface of a mirror substrate during a coating process in accordance with the present invention.
Figure 22:
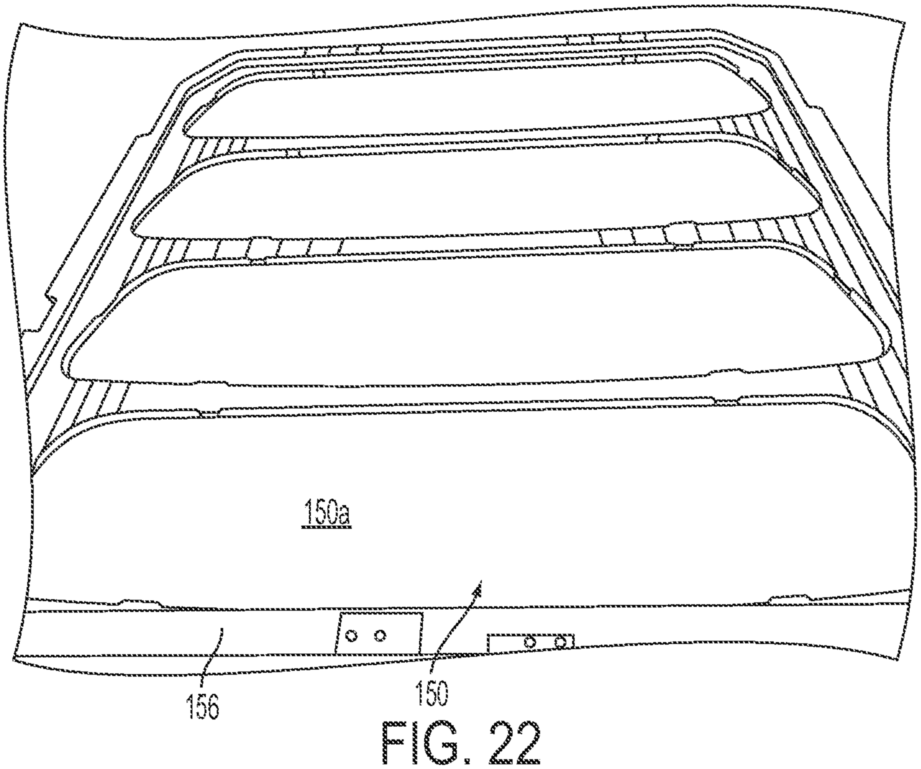
Figure 23:
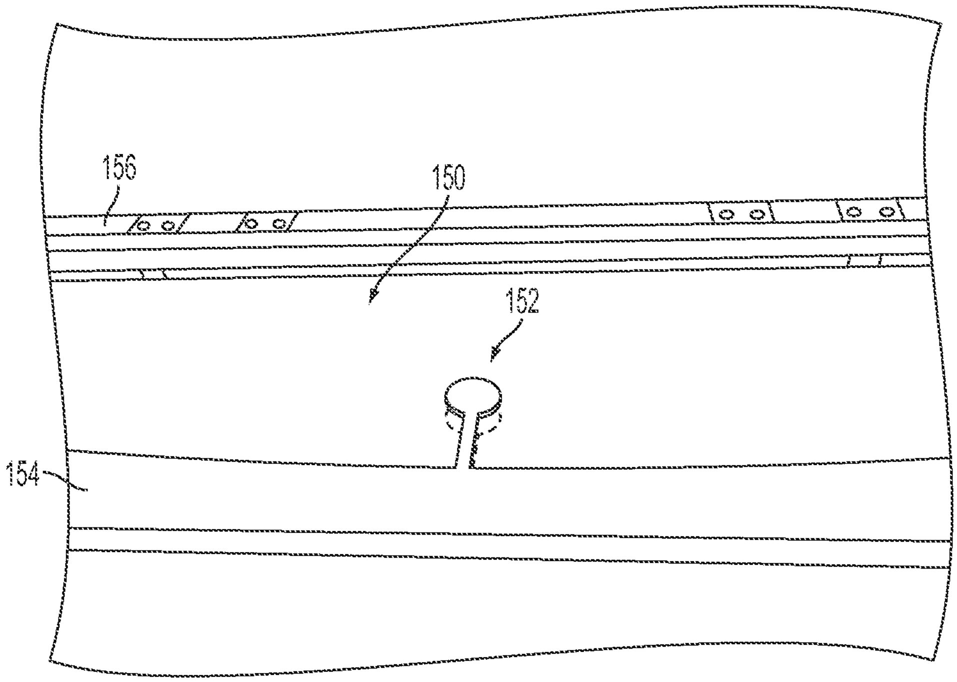
Figure 24:
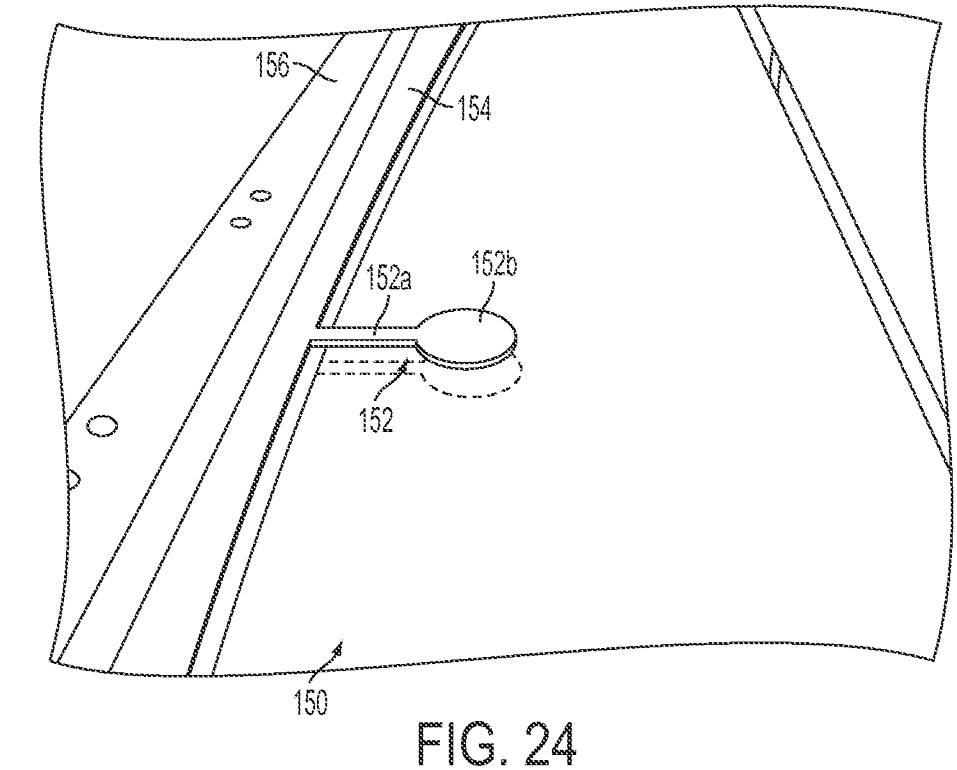

In the illustrated embodiment, electrical connectors 330, 332 comprise common connectors having the same construction, whereby common connector parts can be used for connecting to the second surface transparent conductive coating 326 and to the third surface conductive coating 328, thereby reducing part numbers in the manufacturing facility. Electrical connector 330, 332 comprises an electrode clip 333*a* and an attachment portion 333*b* and a connecting portion or crimp portion 333*c*. As shown in FIG. 15, attachment portion 333*b* is at about a 90 degree angle relative to clip portion 333*a*, so that when attachment portion 333*b* is at or on the rear or fourth surface 322*b* of rear substrate 322, the clip portion 333*a* extends along a perimeter edge portion or edge dimension of the rear substrate 322. The attachment portion 333*b* may include apertures 333*d* therethrough to enhance the adhesion and/or retention of the attachment portion 333*b* at the fourth surface 322*b* of the rear substrate 322. In the illustrated embodiment, the clip portion 333*a* may be similar to a standard sized clip (such as for clipping to a 1.6 mm thick glass substrate) or the like, and has the attachment portion 333*b* and wire connecting portion 333*c* extending therefrom (where the connector may be a stamped metallic part with the clip portion 333*a*, attachment portion 333*b* and connecting portion 333*c* unitarily formed or stamped or where the attachment portion 333*b* and connecting portion 333*c* may be attached to or otherwise formed with clip portion 333*a*).

Figure 16:
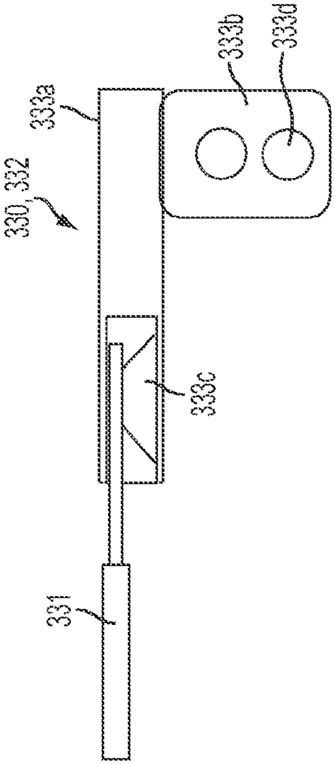
FIG. 16 is a plan view of the electrical connector of FIG. 15, shown with a conductive element or wire connected thereto.

A wire or lead 331 (FIG. 16) may be electrically conductively connected to connecting portion 333*c* of electrical connector 330, 332, such as by inserting a lead end or terminal end of the wire into a receptacle. Optionally, and desirably, the wire attachment to the connecting portion may be a solderless push-in connection that does not require any soldering or crimping to secure the wire at the connector and to establish electrical conductivity at the connection. Optionally, the connection of the wire to the connecting portion may be crimped and/or soldered as well, such as by crimping the receptacle at the wire end to secure and conductively connect the wire to the electrical connector. Optionally, and desirably, the connecting portion 333*c* may be configured to allow for insertion of the wire 331 from either end of the connecting portion to adapt the connector for different applications and/or connection at different sides or regions of the reflective element. The connecting portion 333*c* thus may receive the end of the wire to be conductively connected to the end of the wire, or the connecting portion may be crimped to a wire or otherwise connected to a wire (such as via solder or the like) to establish electrical continuity at the connection, and the opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, and as shown in FIG. 14, electrical connector 330 may electrically conductively connect to the transparent conductive coating 326 at second surface 320*b* of front substrate 320. For example, clip portion 333*a* of electrical connector 330 may be disposed at the overhang region of front substrate 320, but may not be clipped to or may not receive the perimeter edge portion or region 322*c* of rear substrate 322. A conductive material 334 (such as a conductive potting material or conductive epoxy or the like) may be disposed at the overhang region and encapsulate clip portion 333*a* and conductively connect clip portion 333*a* to transparent conductive coating 326. Perimeter seal 325 may electrically and conductively isolate clip portion 333*a* and conductive material 334 from conductive coating 328 at third surface 322*a* of rear substrate 322, such as in a similar manner as discussed above. An adhesive or bonding material 335 may be disposed at fourth surface 322*b* of rear substrate 322 to adhere attachment portion 333*b* and electrical connector 330 to the rear substrate 322.

Electrical connector 332 may electrically conductively connect to third surface conductive coating 328 by clipping to or receiving an edge portion 322*d* of rear substrate, such as in a similar manner as described above. The rear substrate 322 may include a tab out coating or layer that is conductively connected to the third surface conductive coating 328 and that provides for electrical conductive connection to the third surface conductive coating 328 at a perimeter region of the rear substrate that is outboard of the perimeter seal 325, such as in a similar manner as also described above. As shown in FIG. 14, the clip portion 331*a* of electrical connector 332 may be encapsulated (such as by any suitable encapsulant 336) at the third surface of the rear substrate to seal the electrical connection at the third surface tab out portion of the reflective element.

During assembly of the reflective element assembly, the electrical connector 330 may have its clip portion 333*a* inserted into the conductive epoxy 334 and its attachment portion 333*b* adhered or bonded at the fourth surface 322*b* of rear substrate 322 via an adhesive or bonding material 335. The end of a wire or lead may be inserted into or otherwise connected to connecting portion 333*c* and the opposite end of the wire or lead may be connected to a circuit element or circuit board or wire harness or the like. The other electrical connector 332 may be readily pressed onto the edge region of the rear substrate to electrically conductively connect the clip portion 333*a* to the third surface conductive coating 328 at rear substrate 322. Optionally, the attachment portion 333*b* of electrical connector 332 may be adhered at the fourth surface of the rear substrate, but the adhesive may not be necessary due to the positive clip attachment at the perimeter edge of the rear substrate. The end of another wire or lead may be inserted into or otherwise connected to connecting portion 333*c* of electrical connector 332 and the opposite end of the wire or lead may be connected to a circuit element or circuit board or wire harness or the like.

Thus, the electrical connectors 330, 332 may comprise a common part or stamping and may enhance the volume of the custom stamping and communize the assembly equipment. The same clip may be used for connecting to both conductive coatings (on the second surface of the front substrate and the third surface of the rear substrate).

Optionally, other electrical connectors may be used for electrical connection to the transparent conductive coating at the second surface of the front substrate, while the electrical connector 332 may clip to the edge of the rear substrate as described above. For example, and with reference to FIGS. 28-32, an electrical connector 330' may include an electrically connecting portion 333*a*', an attachment portion 333*b*' and a wire connecting portion or crimp portion 333*c*'. Attachment portion 333*b*' extends between the electrically connecting portion 333*a*' and the wire connecting portion 333*c*', so that when electrically connecting portion 333*a*' is at or on or in contact with a conductive medium (such as a conductive epoxy or the like) established at an overhang region and between the connecting portion 333*a*' and the transparent conductive coating at the rear or second surface of the front substrate, the attachment portion 333*b*' extends along the rear or fourth surface of the rear substrate (and is adhered or secured thereto) and the wire connecting portion 333*c*' is disposed at or along the rear or fourth surface of the rear substrate. The attachment portion 333*b*' may include apertures 333*d*' therethrough to enhance the adhesion and/or retention of the attachment portion 333*b*' (via an adhesive disposed at the fourth surface in the area at which the connector 330' is disposed) at the fourth or rear surface of the rear substrate. Optionally, the connector may be a stamped metallic part with the connecting or contacting portion 333*a*', attachment portion 333*b*' and connecting portion 333*c*' unitarily formed or stamped or the connecting portions may be otherwise attached to or otherwise formed with the attachment portion).

A wire or lead (not shown in FIGS. 28-32) may be electrically conductively connected to connecting portion 333*c*' of electrical connector 330', such as by inserting a lead end or terminal end of the wire into a receptacle of wire connecting portion 333*c*'. Optionally, and desirably, the wire attachment to the connecting portion may be a solderless push-in connection that does not require any soldering or crimping to secure the wire at the connector and to establish electrical conductivity at the connection. Optionally, the connection of the wire to the connecting portion may be crimped and/or soldered as well, such as by crimping the receptacle at the wire end to secure and conductively connect the wire to the electrical connector. Optionally, and desirably, the connecting portion 333*c*' may be configured to allow for insertion of the wire from either end of the connecting portion to adapt the connector for different applications and/or connection at different sides or regions of the reflective element. The connecting portion 333*c*' thus may receive the end of the wire to be conductively connected to the end of the wire and may include flexible tabs 333*e*' that allow for insertion of the wire into the connecting portion 333*c*' and that contact the exposed wire to electrically conductively connect the wire to the connector, while limiting or substantially precluding retraction of the wire from the connecting portion, or the connecting portion may be crimped to a wire or otherwise connected to a wire (such as via solder or the like) to establish electrical continuity at the connection. The opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, electrical connector 330' may electrically conductively connect to the transparent conductive coating at the rear or second surface of the front substrate (such as the front substrate 320 of reflective element assembly 314 of FIGS. 13 and 14). For example, connecting portion 333*a*' of electrical connector 330' may be disposed at the overhang region of the front substrate, but not clipped to the perimeter edge portion or region of the rear substrate. A conductive material (such as a conductive potting material or conductive epoxy or the like) may be disposed at the overhang region and encapsulate connecting portion 333*a*' and contact the transparent conductive coating at the rear surface of the front substrate to conductively connect the connector 330' to the transparent conductive coating at the rear surface of the front substrate. The perimeter seal of the reflective element assembly may electrically and conductively isolate the connector 330' and the conductive material from the conductive coating at the third or front surface of the rear substrate, such as in a similar manner as discussed above. An adhesive or bonding material may be disposed at the fourth surface of the rear substrate and at the attachment portion 330*b*' to adhesively bond the connector at the rear substrate of the reflective element.

Figure 33:
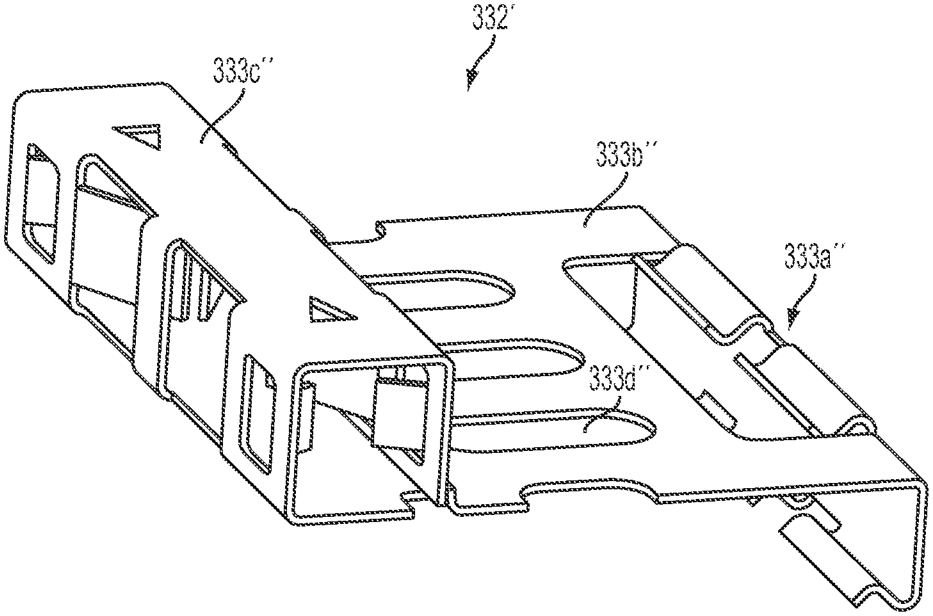
FIG. 33 is a perspective view of another electrical connector for electrically connecting to a conductive coating of the reflective element assembly of the present invention.
Figure 34:
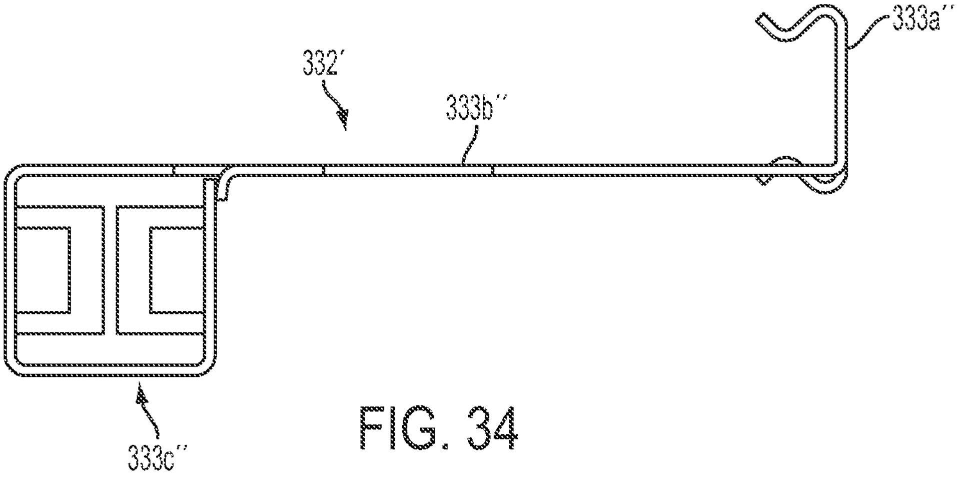
FIG. 34 is a plan view of the electrical connector of FIG. 33.

Optionally, the electrical connector for electrically conductively connecting to the conductive coating at the third or front surface of the rear substrate may be similar in construction to connector 330', discussed above. For example, and with reference to FIGS. 33 and 34, an electrical connector 332' may include an electrically connecting portion or clip 333*a*", an attachment portion 333*b*" and a wire connecting portion or crimp portion 333*c*". Attachment portion 333*b*" extends between the electrically connecting clip 333*a*" and the wire connecting portion 333*c*", so that when electrically connecting clip 333*a*" is clipped to the perimeter edge region of the rear substrate such that electrical conductivity is established between the connector 332' and the third surface conductive coating, the attachment portion 333*b*" extends along the rear or fourth surface of the rear substrate (and is adhered or secured thereto) and the wire connecting portion 333*c*" is disposed at or along the rear or fourth surface of the rear substrate. The attachment portion 333*b*" may include apertures 333*d*" therethrough to enhance the adhesion and/or retention of the attachment portion 333*b*" (via an adhesive disposed at the fourth surface in the area at which the connector 332' is disposed) at the fourth or rear surface of the rear substrate. Optionally, the connector may be a stamped metallic part with the connecting or contacting portion 333*a*", attachment portion 333*b*" and connecting portion 333*c*" unitarily formed or stamped or the connecting portions may be otherwise attached to or otherwise formed with the attachment portion). The connector 332' thus may clip to the perimeter edge region of the rear substrate to establish electrical conductivity between the wire connecting portion and the third surface conductive coating on the front or third surface of the rear substrate of the reflective element, but may otherwise be similar in construction to electrical connector 330', discussed above, such that a detailed discussion of the electrical connectors need not be repeated herein.

Figure 38:
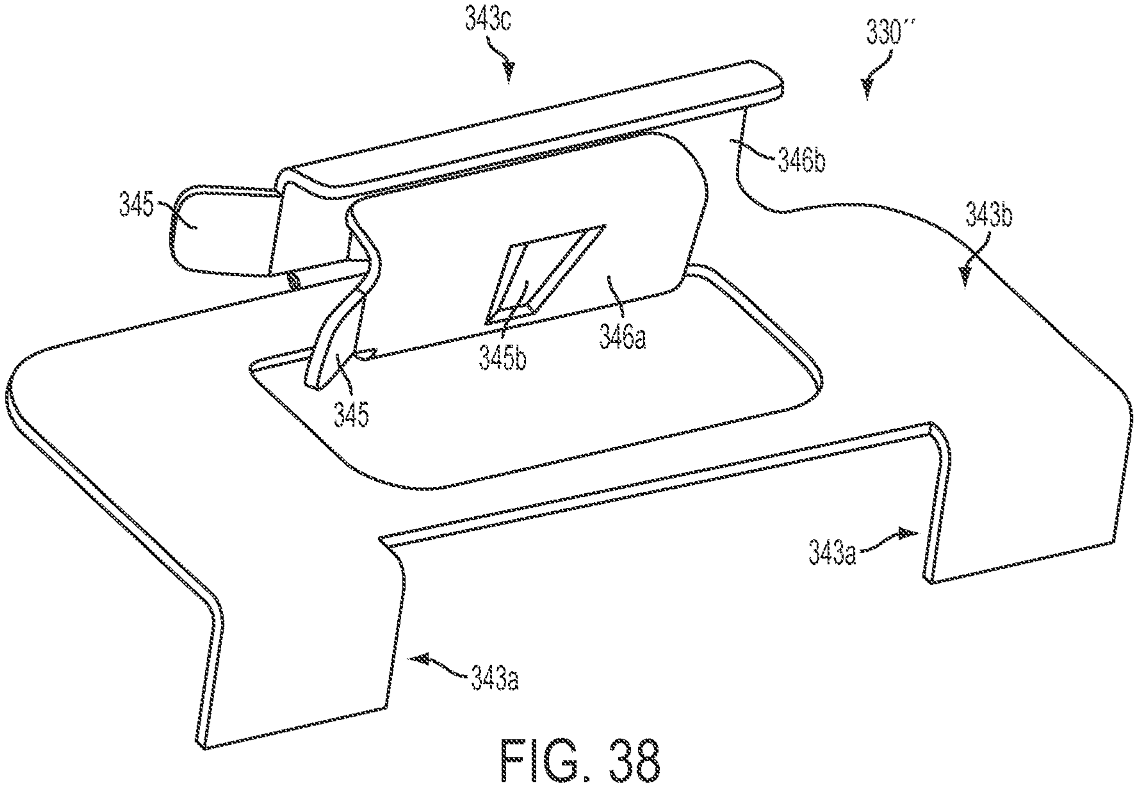

Optionally, an electrically conductive connector 330" (FIG. 38) may include an electrically connecting portion or tab or tabs 343*a*, an attachment portion 343*b* and a wire connecting portion or crimp portion 343*c*. Attachment portion 343*b* extends between the electrically connecting portion 343*a* and the wire connecting portion 343*c*, so that when electrically connecting portion 343*a* is at or on or in contact with a conductive medium (such as a conductive epoxy or the like) established at an overhang region and at or between the connecting portion 343*a* and the transparent conductive coating at the rear or second surface of the front substrate, the attachment portion 343*b* extends along and/or from the rear or fourth surface of the rear substrate (and is adhered or secured thereto) and the wire connecting portion 343*c* is disposed at or along (or spaced from) the rear or fourth surface of the rear substrate, such as in a similar manner as discussed above with respect to electrically conductive connector 330'. Optionally, the connector 330" may comprise a stamped metallic part with the connecting or contacting portion 343*a*, attachment portion 343*b* and connecting portion 343*c* unitarily formed or stamped or the connecting portions may be otherwise attached to or otherwise formed with the attachment portion).

Figure 35:
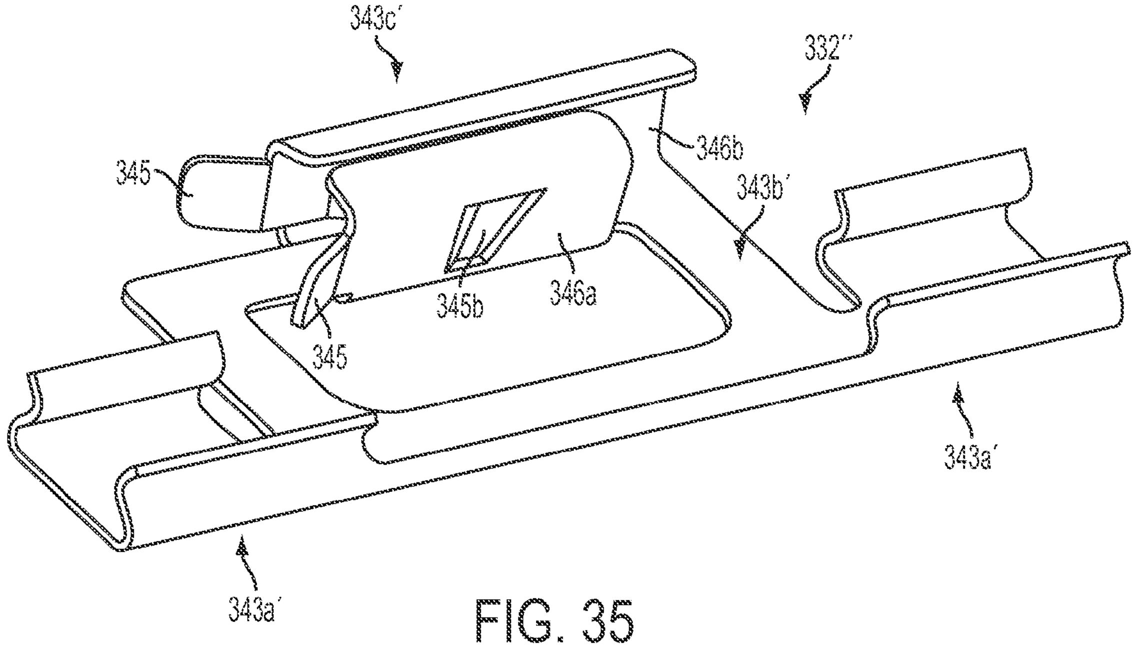
FIG. 35 is a perspective view of another electrical connector for electrically connecting to a conductive coating of a reflective element assembly in accordance with the present invention, such as via clipping to an edge region of a rear substrate of the reflective element assembly.
Figure 36:
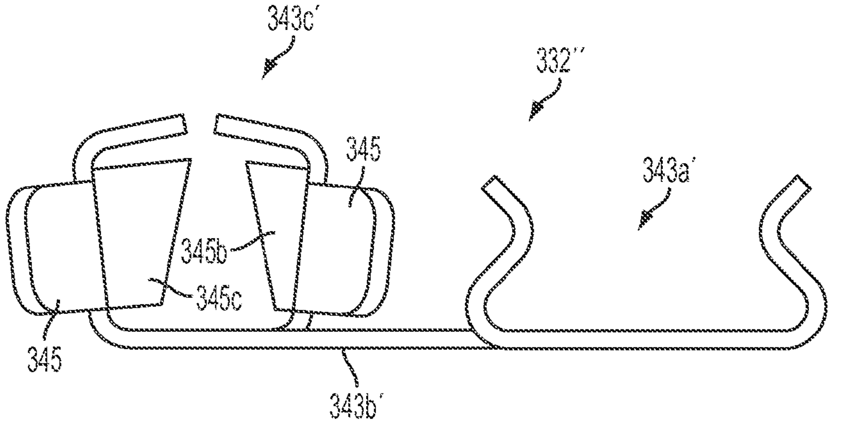
FIG. 36 is an end elevation of the electrical connector of FIG. 35.
Figure 37:
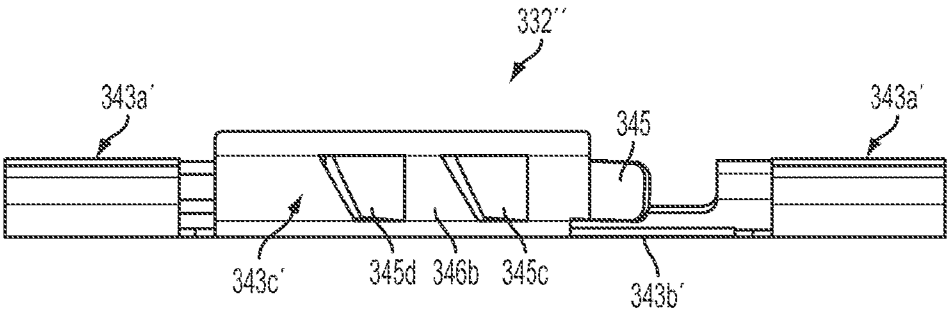
FIG. 37 is a top view of the electrical connector of FIG. 35.

Also, an electrical connector 332" (FIGS. 35, 36 and 37) for electrically conductively connecting to the electrically conductive coating at the third surface or front surface of the rear substrate of an electrochromic reflective element may include an electrically connecting portion or clip 343*a*', an attachment portion 343*b*' and a wire connecting portion or crimp portion 343*c*'. Attachment portion 343*b*' extends between the electrically connecting clip 343*a*' and the wire connecting portion 343*c*', so that when electrically connecting clip 343*a*' is clipped to the perimeter edge region of the rear substrate such that electrical conductivity is established between the connector 332" and the third surface conductive coating, the attachment portion 343*b*' extends from the rear or fourth surface of the rear substrate and the wire connecting portion 343*c*' is disposed at or along (or spaced from) the rear or fourth surface of the rear substrate. Optionally, the connector 332" may comprise a stamped metallic part with the connecting or contacting portion 343*a*', attachment portion 343*b*' and connecting portion 343*c*' unitarily formed or stamped or the connecting portions may be otherwise attached to or otherwise formed with the attachment portion). The connector 332" thus may clip to the perimeter edge region of the rear substrate to establish electrical conductivity between the wire connecting portion and the third surface conductive coating on the front or third surface of the rear substrate of the reflective element, but may otherwise be similar in construction to electrical connector 330", such that a detailed discussion of the electrical connectors need not be repeated herein. Thus, instead of using the same part and orienting the part in a different way (such as discussed below with respect to connector 530), the connectors 330", 332" comprise different parts. The different parts may have similar wire connecting portions and attachment portions, with different substrate connecting portions, and may be formed with the same stamping tool with some changeable inserts to form the alternate construction of the substrate connecting portions.

Figure 39:
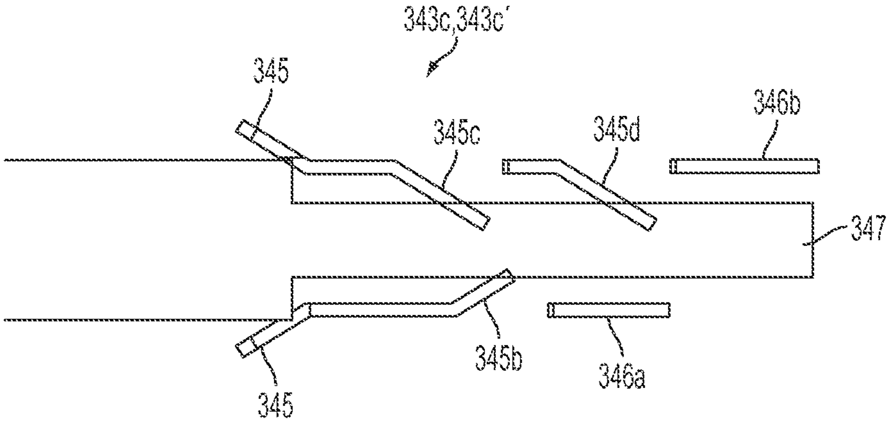
FIG. 39 is a sectional view of the wire connecting portions of the electrical connectors of FIGS. 35 and 38.

In the illustrated embodiments, the wire connecting portions 343*c*, 343*c*' of electrically conductive connectors 330", 332" comprise a wire receiving element for receiving an end of a wire or lead 347 inserted into the wire connecting portion. The wire connecting portions 343*c*, 343*c*' may provide for receiving the ends of wires in one direction (and may not provide for insertion of the wire into the connecting element from either direction). As shown in FIG. 39, wire connecting portion 343*c*, 343*c*' comprises a pair of flared tabs 345*a* to help guide the wire into the receptacle or contact area of the connecting portion or element. Wire connecting portion 343*c*, 343*c*' includes a contact spring element, which may extend inward from one or more of the walls of the connecting portion 343*c*, 343*c*'. For example, the wire connecting portion 343*c*, 343*c*' may include three contact spring elements or features 345*b*, 345*c*, 345*d* that extend inward from respective walls or wall portions 346*a*, 346*b* of wire connecting portion 343*c*, 343*c*'. The spring elements 345*b-d* may be cut or stamped or otherwise formed at an angle to help force the wire toward the base of the part and avoid the wire from sliding or popping out or retracting when the two main sides or walls 346*a*, 346*b* of the connector may flex open a little during wire insertion. Optionally, and desirably, the contact edges of the tabs 345*b-d* may comprise cut edges or sharp edges for optimum wire retention and bite into the wire that is inserted into the wire connecting portion 343*c*, 343*c*' of connectors 330", 332".

Optionally, and desirably, a conductive epoxy may be disposed along the edge of the substrate and may wrap onto the rear or fourth surface of the rear substrate. The connector may be held in place at the conductive epoxy and the epoxy may be cured to hold the connector at the glass substrate. The conductive epoxy thus may provide mechanical anchoring and environmental protection or sealing and electrical connection at the connection of the connector to the conductive coatings. Thus, a preformed metallic connector may be adhered to the substrate and electrically connected or conductively connected to the conductive coating via a conductive epoxy or the like.

Therefore, the present invention provides an electrical connector that may clip onto a perimeter edge of the rear substrate and an electrical connector that may be disposed at an overhang region with electrically conductive continuity established between the connector and the transparent conductor coating at the rear surface of the front substrate via a conductive epoxy or the like. The electrical connector may solderlessly connect to a wire via insertion of the wire into the wire receiving or connecting portion of the connector (and the connecting portion may retain the wire therein via flexible tabs or the like or the connecting portion may be crimped or otherwise adapted to retain the wire within the connecting portion). Thus, for example, one electrical connector may be disposed at and clipped at a perimeter region of the rear substrate and may establish electrically conductive continuity to a tab-out portion of the metallic conductive reflector coating at the front surface of the rear substrate, while another electrical connector may be disposed at the rear of the front substrate (such as at an overhang region or offset region where a dimension of the front substrate extends beyond a corresponding dimension of the rear substrate), whereby electrically conductive continuity may be established between the connector and the transparent conductive coating at the rear surface of the front substrate, such as via a conductive epoxy or the like. A first wire or lead may thus make an electrical connection to the first electrical connector and thus to the third surface conductor coating (and may provide, for example, a negative wire or terminal or connection) while another wire or lead may make electrical connection to the second electrical connector and thus to the second surface transparent conductive coating. For example, the other or second wire may comprise a positive terminal or wire or connection and may be electrically conductively connected to the second surface transparent conductive coating via a conductive epoxy that is dispensed or disposed at or over a portion of the electrical connector at the overhang region (such as at a small step or flange in the stamped electrical connector that establishes or supports the wire at or rearward of the fourth surface of the rear glass substrate so as to give clearance for equipment to dispense the conductive epoxy at and at least partially over the connecting portion of the electrical connector).

Optionally, an electrical connector may be used to clip to the edge of the rear substrate (such as described above) or to establish electrically conductive continuity to the electrically conductive coating at the rear surface of the front substrate (such as via a conductive epoxy or the like). For example, and with reference to FIGS. 40-42, an electrical connector 530 may include an electrically connecting portion or substrate connecting portion or clip portion 533*a*, an attachment portion 533*b* and a wire connecting portion or crimp portion 533*c*. Attachment portion 533*b* extends between the electrically connecting portion 533*a* and the wire connecting portion 533*c*, so that when electrically connecting portion 533*a* is at or on or in contact with a conductive medium (such as a conductive epoxy or the like) established at an overhang region and between or at the connecting portion 533*a* and the transparent conductive coating at the rear or second surface of the front substrate (such as shown in FIG. 41), the attachment portion 533*b* extends along or from the rear or fourth surface of the rear substrate and the wire connecting portion 533*c* is disposed at or along the rear or fourth surface of the rear substrate (and may be adhered or secured thereto). Likewise, when the connector 530 is used to clip onto the perimeter edge region or portion of a rear substrate to establish electrically conductive continuity to an electrically conductive coating at the front surface of the rear substrate, the attachment portion 533*b* extends generally along or from the rear or fourth surface of the rear substrate, and the wire connecting portion 533*c* may be spaced from the rear or fourth surface of the reflective element (such as shown in FIG. 42). Optionally, the connector may be a stamped metallic part with the connecting or contacting portion 533*a*, attachment portion 533*b* and connecting portion 533*c* unitarily formed or stamped or the connecting portions may be otherwise attached to or otherwise formed with the attachment portion).

A wire or lead (not shown in FIGS. 40-42) may be electrically conductively connected to connecting portion 533*c* of electrical connector 530, such as by inserting a lead end or terminal end of the wire into a receptacle of wire connecting portion 533*c*. Optionally, and desirably, the wire attachment to the connecting portion may be a solderless push-in connection that does not require any soldering or crimping to secure the wire at the connector and to establish electrical conductivity at the connection. In the illustrated embodiment, the wire connecting portion 533*c* comprises a primary connecting element 540 at each end of the connecting portion 533*c* (so that a wire may be inserted into the connecting portion from either direction with respect to the wire connecting portion 533*c* of electrical connector 530 and establish a primary electrically conductive connection between the wire and the connecting element 540) and a secondary connecting element 542 at a generally central region of the connecting portion 533*c* (so that a secondary electrical connection or contact may be made to a wire inserted into the connecting portion 533*c*). Optionally, the connection of the wire to the connecting portion may be crimped and/or soldered as well, such as by crimping the receptacle at the wire end to secure and conductively connect the wire to the electrical connector.

Figure 40:
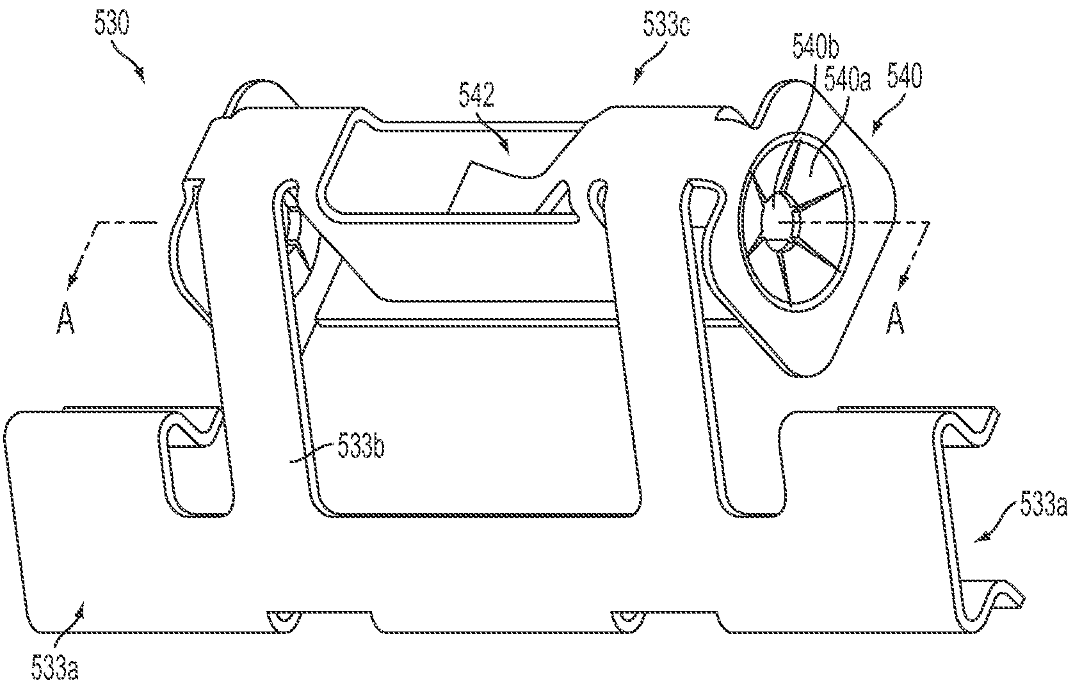
FIG. 40 is a perspective view of another electrical connector for electrically connecting to a conductive coating of a reflective element assembly in accordance with the present invention.
Figure 40A:
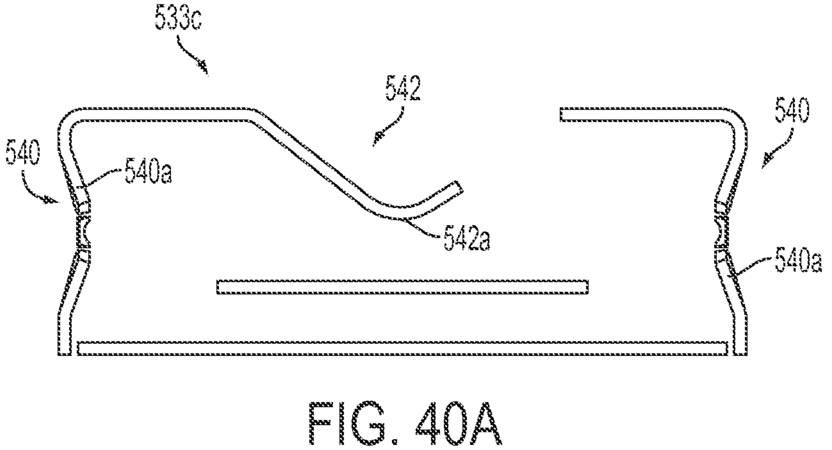
FIG. 40A is a sectional view of the wire connecting portion of the electrical connector, taken along the line A-A in FIG. 40.
Figure 41:
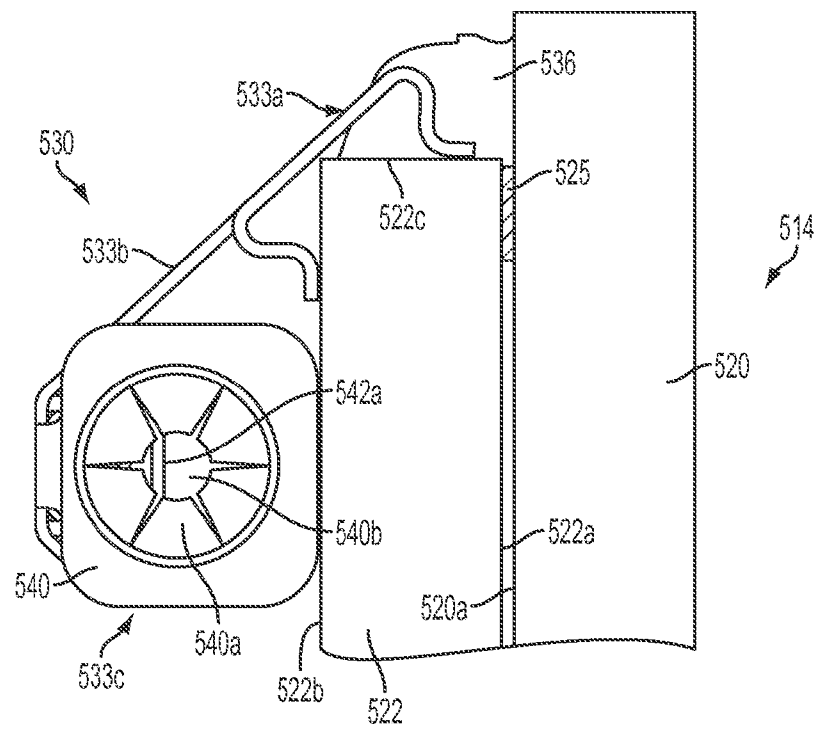
FIG. 41 is an end view of the electrical connector of FIG. 40, shown attached to a reflective element and in electrical conductive continuity with an electrically conductive coating at a rear surface of the front substrate of the reflective element.
Figure 42:
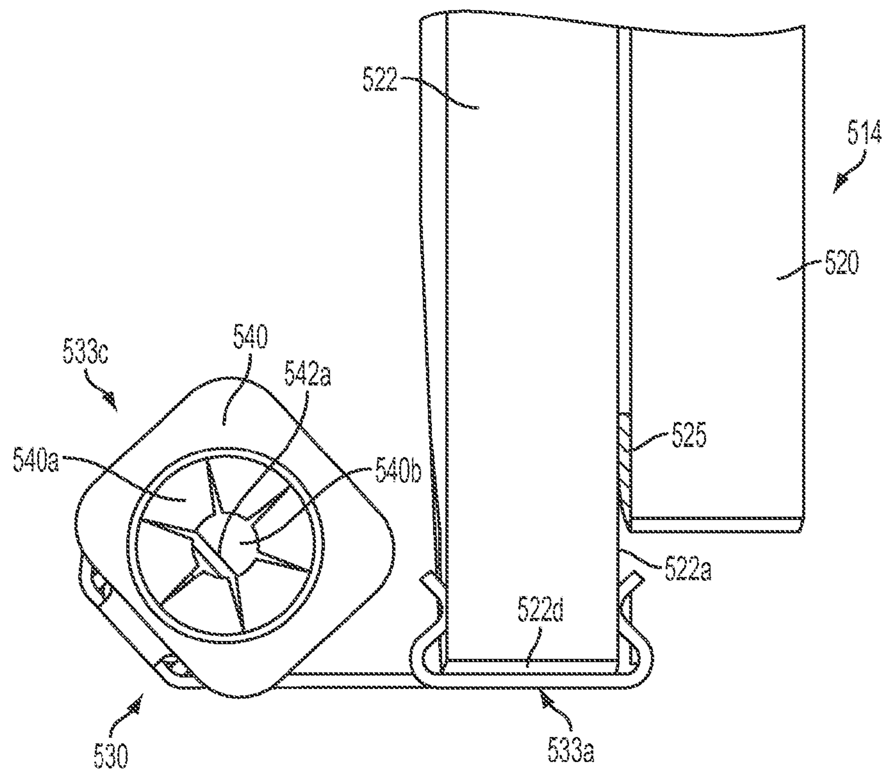
FIG. 42 is an end view of the electrical connector of FIG. 40, shown attached to a perimeter edge region of the rear substrate of the reflective element and in electrical conductive continuity with an electrically conductive coating at the rear substrate of the reflective element.

In the illustrated embodiment, and as shown in FIGS. 40-42, the primary connecting element 540 comprises a PALNUT® type of connecting element, with a plurality of flexible tabs 540*a* disposed around an aperture 540*b*. The inner or contacting ends of the flexible tabs 540*a* may comprise sheared edges (as formed or established during the stamping or forming of the connector 530, and thus may bite into the wire when the wire is inserted into the connecting portion 533*c*. In the illustrated embodiment, the secondary connecting element 542 comprises an internal cantilever spring type connecting element, which provides a generally smooth or non-sharp surface 542*a* (FIGS. 40A, 41 and 42) for contacting the wire that is inserted into the connecting portion 533*c*. Thus, the PALNUT® type connecting element 540 may provide the primary retention locking feature and electrical connection between the connector 530 and the wire, while the internal cantilever spring connecting element 542 provides a secondary redundant electrical connection. The electrical connections on the PALNUT® type connecting element 540 may be made at a sheared edge of metal, where the connection to the cantilever spring connecting element 542 may be made at a plated smooth surface. Such a redundant electrically conductive connecting means provides enhanced environmental durability to the electrical connector (such as for situations where the cut edges may start to degrade, the smooth surface would not degrade, and thus one of the connecting elements would continue to provide electrically conductive continuity between the connector and the wire or lead).

Optionally, and desirably, the wire connecting portion 533*c* may be configured to allow for insertion of the wire from either end of the connecting portion to adapt or configure the connector for different applications and/or connection at different sides or regions of the reflective element. The wire connecting portion 533*c* thus may receive the end of the wire and be electrically conductively connected to the end of the wire and may include flexible tabs 540*a* that allow for insertion of the wire into the connecting portion 533*c* and that contact and may bite into the exposed wire to electrically conductively connect the wire to the connector, while limiting or substantially precluding retraction of the wire from the connecting portion. Optionally, the wire connecting portion may be crimped to a wire or otherwise connected to a wire (such as via solder or the like) to establish electrical continuity at the connection. The opposite end of the wire may be connected to a clip or terminal, such as a spade terminal or plug/socket connector of a wire harness or the like, at a circuit element or circuit board or the like. Optionally, the connecting portion of the electrical connector may comprise any suitable connector, such as a spade terminal or the like, and may allow for manual connection or insertion without soldering of the wire to the connecting portion, while remaining within the spirit and scope of the present invention.

Thus, electrical connector 530 may electrically conductively connect to the transparent conductive coating at the rear or second surface of the front substrate (such as a front substrate 520 of a reflective element assembly 514). For example, and as shown in FIG. 41, connecting portion 533*a* of electrical connector 530 may be disposed at the overhang region of the front substrate, but not clipped to the perimeter edge portion or region of the rear substrate. A conductive material 536 (such as a conductive potting material or conductive epoxy or the like) may be disposed at the overhang region and encapsulate at least a portion of the connecting portion 533*a* and contact the transparent conductive coating at the rear surface 520*a* of the front substrate 520 to conductively connect the connector 530 to the transparent conductive coating at the rear surface of the front substrate. The perimeter seal 525 of the reflective element assembly 514 may electrically and conductively isolate the connector 530 and the conductive material 536 from the conductive coating at the third or front surface 522*a* of the rear substrate 522, such as in a similar manner as discussed above. An adhesive or bonding material may be disposed at the perimeter edge region 522*c* of the rear substrate 522 at the overhang region and/or at the fourth surface 522*b* of the rear substrate 522 and at the wire connecting portion 533*c* to adhesively bond the connector 530 at the rear substrate 522 of the reflective element 514.

Optionally, the electrical connector for electrically conductively connecting to the conductive coating at the third or front surface of the rear substrate may be similar or substantially the same in construction to connector 530, discussed above. For example, and with reference to FIG. 42, the electrically connecting portion or clip 533*a* of electrical connector 530 may be clipped to the perimeter edge region 522*d* of the rear substrate 522 such that electrical conductivity is established between the connector 530 and the third surface conductive coating at the third surface or front surface 522*a* of rear substrate 522. When so clipped, the attachment portion 533*b* of connector 530 extends from the rear or fourth surface of the rear substrate and the wire connecting portion 533*c* is disposed at or along (and optionally spaced from) the rear or fourth surface 522*a* of the rear substrate 522.

The connector 530 thus may clip to the perimeter edge region of the rear substrate to establish electrical conductivity between the wire connecting portion and the third surface conductive coating on the front or third surface of the rear substrate of the reflective element. Thus, for assembly or attachment or connection to the third surface electrically conductive coating, the electrical connector may be clipped to the rear or second substrate using a clip configuration in a manner similar to known electrode clips, while the same part may be used for the epoxy connection to the second surface electrically conductive coating by orienting the connector at an angle such that the bottom legs of the clip or connecting portion 533*a* are disposed in or sit into the conductive epoxy dispensed in the offset region to make electrically conductive connection or contact with the second surface electrically conductive coating. Optionally, and desirably, an adhesive or glue may be disposed at the fourth surface and/or overhang region to mechanically attach the electrical connector at or to the fourth or rear surface of the rear glass substrate of the reflective element assembly.

Optionally, and desirably, an electrically conductive trace, such as a cured silver-filled conductive epoxy or the like, may be disposed along the edge of the substrate and may wrap onto the rear or fourth surface of the rear substrate. The connector may be held in place at the conductive epoxy and the epoxy may be cured to hold the connector at the glass substrate. The conductive epoxy thus may provide mechanical anchoring and environmental protection or sealing and electrical connection at the connection of the connector to the conductive coatings. Thus, a preformed metallic connector may be adhered to the substrate and electrically connected or conductively connected to the conductive coating via a conductive epoxy or the like.

Optionally, the reflective element assembly may include a heater pad disposed at a rear surface of the reflective element, and may include a backplate disposed at and at least partially over the heater pad. For example, and with reference to FIGS. 26-27B, a reflective element assembly 410 (such as for an exterior rearview mirror assembly of a vehicle) includes an electro-optic reflective element 412 (such as en electrochromic reflective element or cell), a heater pad 414 and a backplate 416.

The reflective element or cell 412 has electrical connectors 412*a*, 412*b*, such as male spade connectors or the like, and such as electrical connectors of the types described above. The electrical connectors 412*a*, 412*b* are electrically conductively connected (such as via busbars or the like disposed at the reflective element) to the electrically conductive coatings on the first and second substrates of the reflective element, such as in any suitable manner and such as described above. In the illustrated embodiment, the electrical connectors 412*a*, 412*b* are disposed or established at opposite sides of the reflective element and are readily accessible at the rear surface of the reflective element for connection to electrical connectors 414*a*, 414*b* of heater pad 414 when the heater pad is affixed or adhered to the rear surface of the reflective element 412.

Figure 26:
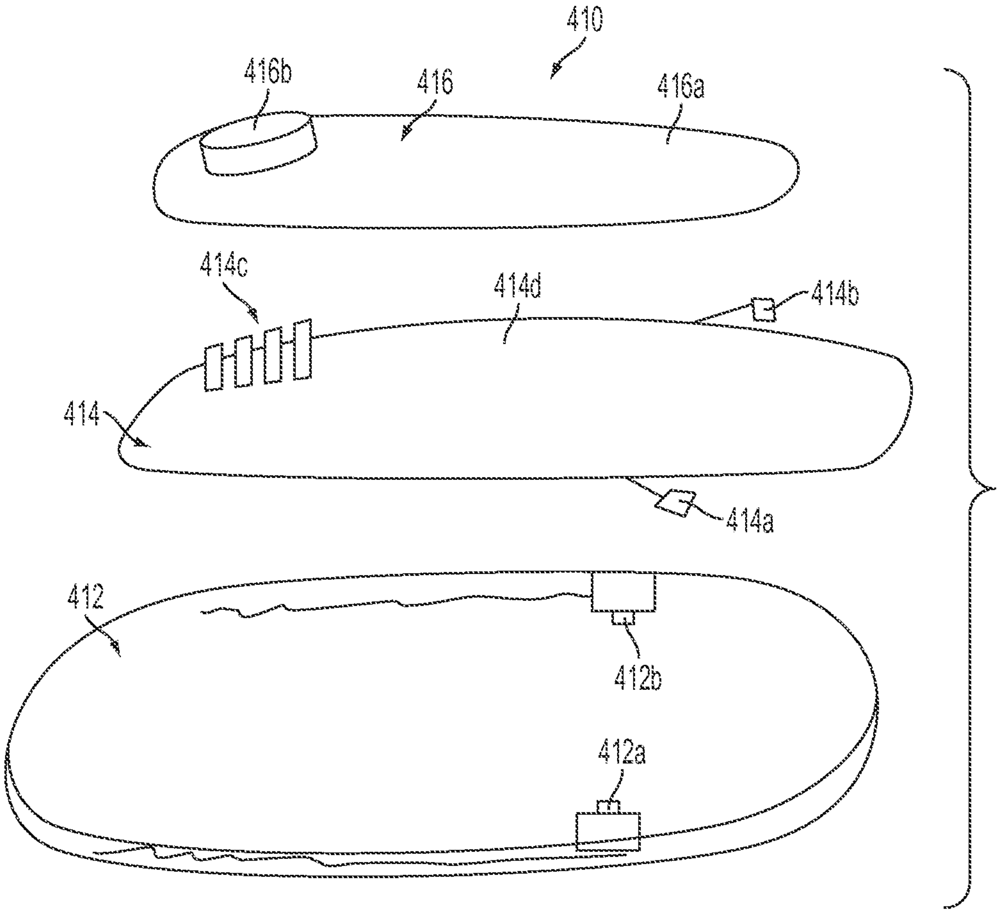
FIG. 26 is an exploded perspective view of a rearview mirror reflective element assembly with a heater pad and backplate in accordance with the present invention.
Figure 27:
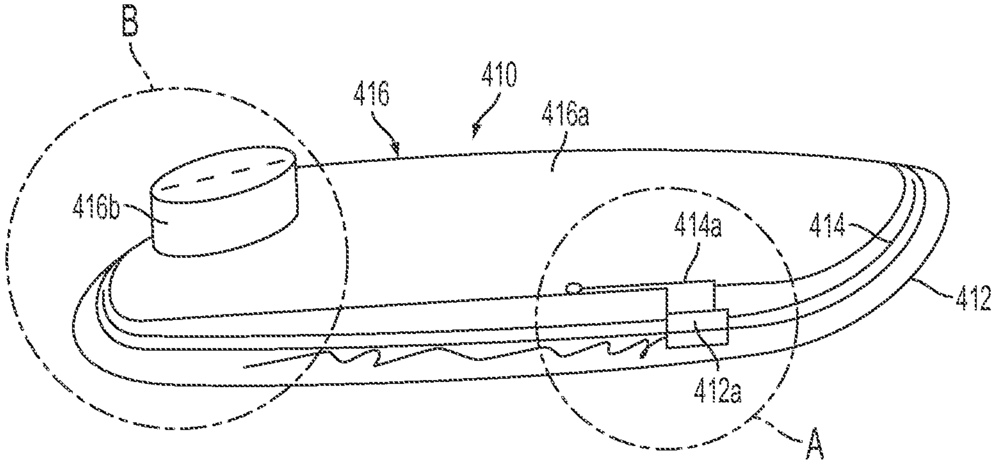
FIG. 27 is a perspective view of the rearview mirror reflective element assembly of FIG. 26.
Figure 27A:
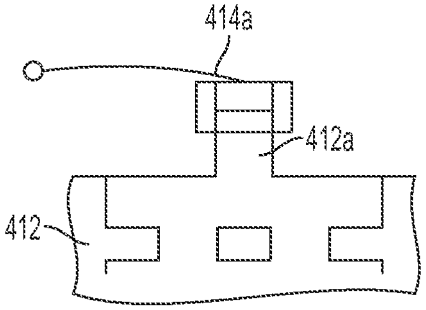
FIG. 27A is an enlarged view of the area A of FIG. 27, showing an electrical connector at the reflective element that electrically connects to electrical wiring of the heater pad in accordance with the present invention.
Figure 27B:
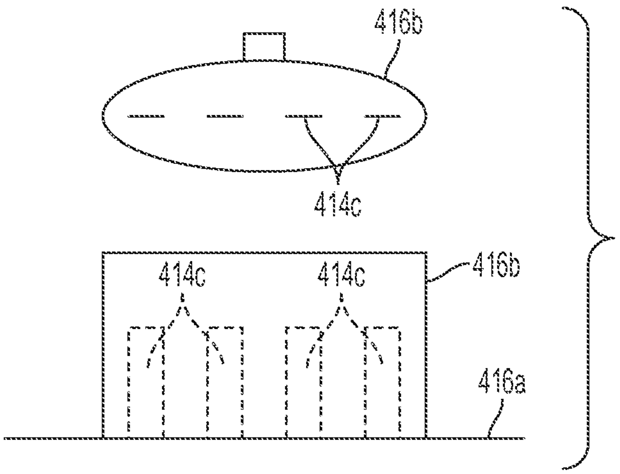
FIG. 27B is an exploded schematic of the area B of FIG. 27, showing the electrical connector at the backplate of the rearview mirror reflective element assembly of FIG. 27.
Figure 28:
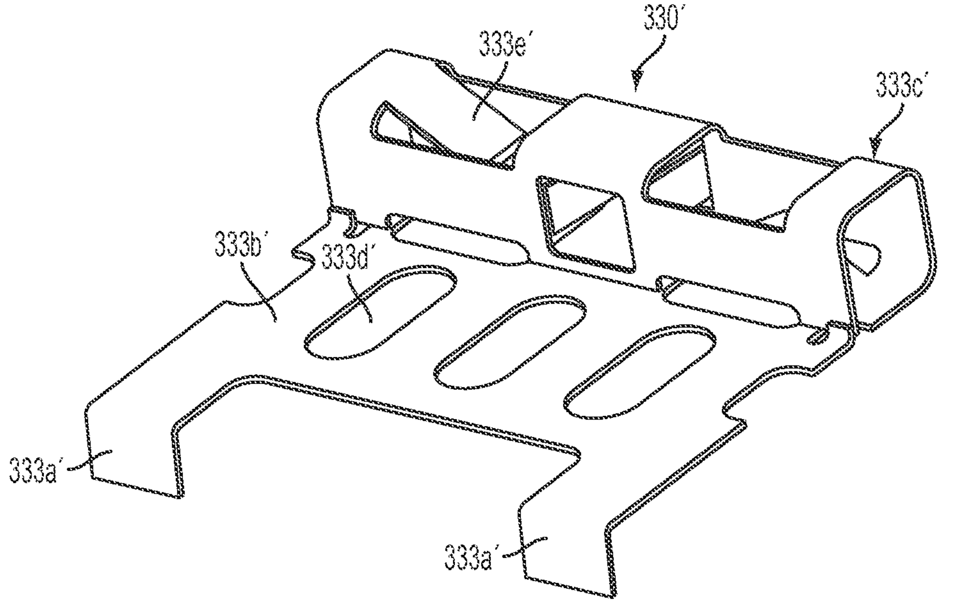
FIG. 28 is a perspective view of another electrical connector for electrically connecting to a conductive coating of the reflective element assembly of the present invention.
Figure 29:
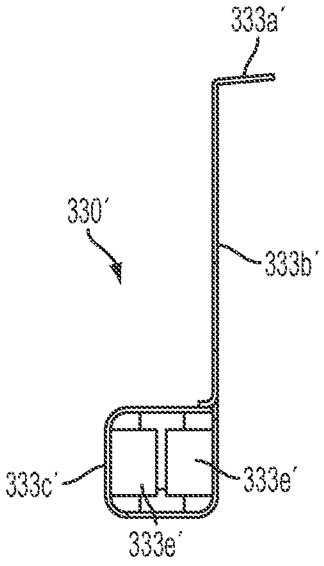
FIG. 29 is an end elevation of the electrical connector of FIG. 28.
Figure 30:
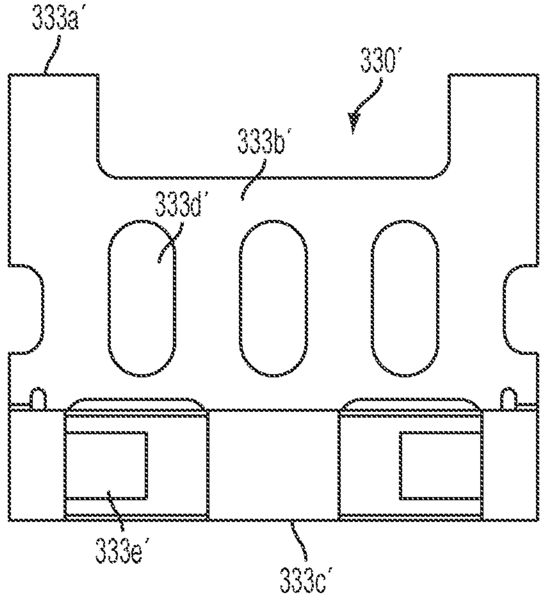
FIG. 30 is a plan view of the electrical connector of FIGS. 28 and 29.
Figure 31:
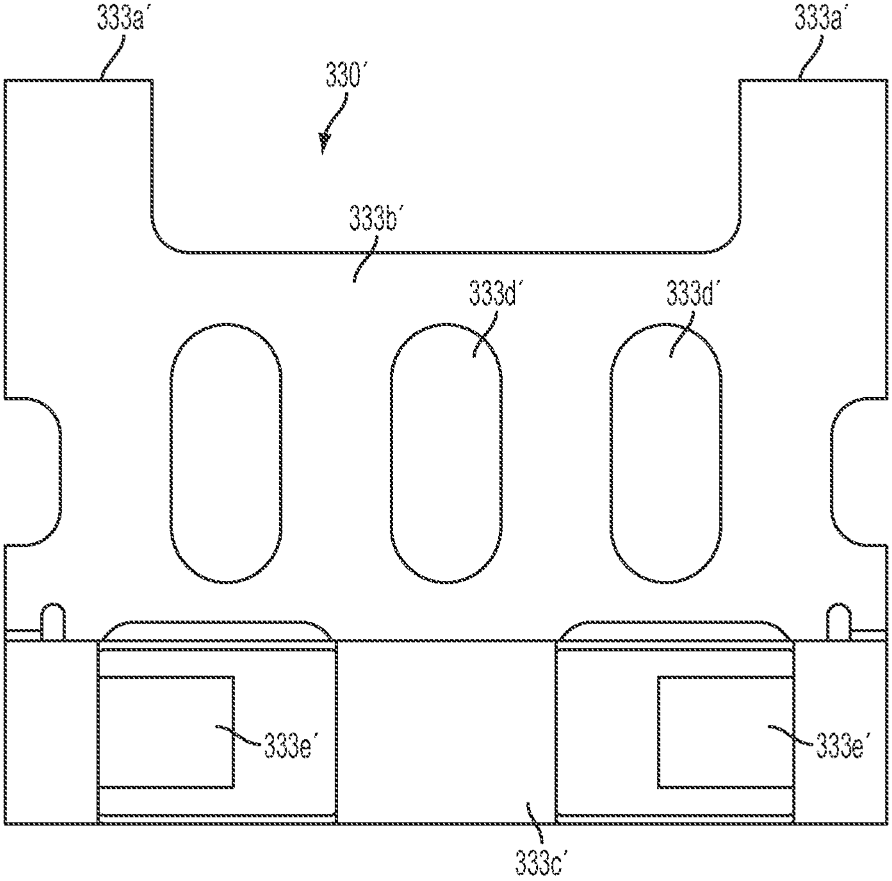
FIG. 31 is another plan view of the electrical connector of FIGS. 28-30.
Figure 32:
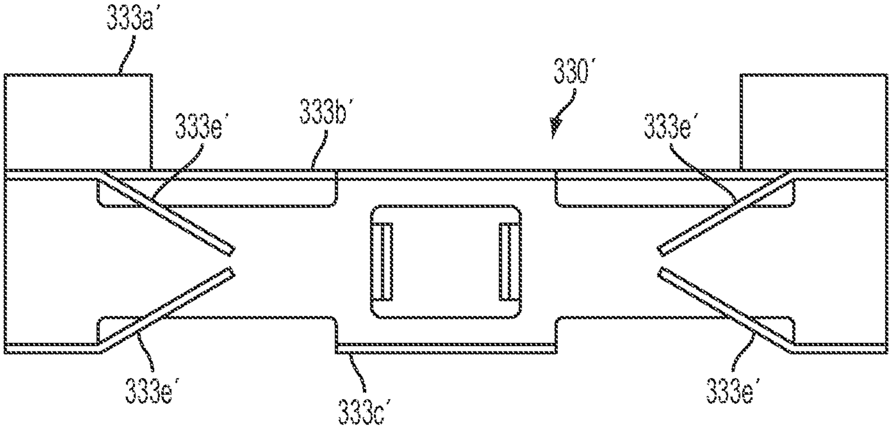
FIG. 32 is another plan view of the electrical connector of FIGS. 28-31.

Heater pad 414 may be similar to known heater pads, and may utilize aspects described in U.S. Pat. Nos. 4,882,466 and/or 7,400,435, which are hereby incorporated herein by reference in their entireties. As shown in FIG. 26, heater pad includes electrical connectors 414*a*, 414*b* for electrically conductively connecting to connectors 412*a*, 412*b* of reflective element 412. In the illustrated embodiment, electrical connectors 414*a*, 414*b* (such as female spade connectors or the like) are disposed at the ends of respective wires that extend from opposite sides of the heater pad 414, whereby the electrical connectors 414*a*, 414*b* may be readily connected to the electrical connectors 412*a*, 412*b* during the assembly process of the reflective element assembly. Heater pad 414 also includes a plurality of electrical terminals 414*c* protruding from the heater pad substrate 414*d*, with the terminals 414*c* being associated with the electrical connectors 414*a*, 414*b* and with the heating elements (not shown) of the heater pad substrate 414*d*.

As shown in FIG. 26, backplate 416 may comprise a generally planar portion 416*a* with a molded socket connector 416*b* extending rearwardly from the planar portion 416*a* (and desirably unitarily formed or integrally molded, such as via injection molding, with the generally planar backplate portion 416*a*). When backplate 416 is attached to heater pad 414 and/or reflective element 412, terminals 414*c* of heater pad 414 extend at least partially into molded connector 416*b*, whereby the terminals may be in electrical conductive contact with terminals or ends of wires of a vehicle or mirror wiring harness that may plug into the socket connector 416*b* to provide power and control to the heater pad and reflective element cell when the reflective element assembly is normally mounted at a rearview mirror assembly of a vehicle.

Optionally, and desirably, the electrical conductive connections are established via male spade connectors 412*a*, 412*b* and female spade connectors 414*a*, 414*b* or vice versa or the like, and thus may obviate the need for soldering the leads to the reflective element. Optionally, and desirably, the heater pad may include circuitry for driving the electro-optic cell, thereby reducing or obviating the need for a wiring harness and wire routing to the reflective element. Also, because the connectors are disposed at opposite sides of the reflective element, the connections may be readily made during the assembly process in an enhanced and error proof manner that limits or substantially precludes connecting the wrong connectors together.

Thus, a male connector at an end of a mirror wiring harness may be plugged into the molded connector 416*b* of backplate 416 to provide power and/or control to the heater pad and to the electro-optic reflective element cell. The assembly of the reflective element assembly or sub-assembly is enhanced by the connections between the reflective element and the heater pad and by the establishment of the female or socket connector at the backplate during assembly of the reflective element assembly or sub-assembly.

Optionally, and desirably, the assembly of components 416, 414, 412 may be accomplished in a z-axis fashion (see FIG. 26), where the heater pad 414 connects to the reflective element 412 and the backplate 416 connects to the heater pad 414, preferably with electrical and/or mechanical connections being made at the same or substantially the same time, and more preferably without any need for an electrical solder connection (or at least reduced minimal need for a solder connection). For example, the electrical connectors or leads may comprise plug and socket type mechanical and electrical connection or connect & crimp type mechanical and electrical connection or interference fit mechanical and electrical connection so that the solderless electrical connections can be made as the mechanical connection or attachments are made, thereby reducing manual operations and enhancing the assembly process of the reflective element/heater pad/backplate assembly. Optionally, the electrical connections may be provided by a flying lead or wire, such as at the heater pad for connecting to the terminals or leads at the reflective element or, for example, in an interior mirror application (such as discussed in connection with FIGS. 1-16 above) from a connection to a transparent electrically conductive coating of an electrochromic mirror element to a connector on a printed circuit board disposed at the rear of the electrochromic mirror element or cell.

Therefore, in accordance with various aspects of the present invention, a low cost mirror assembly is provided that has reduced cost components and/or reduced cost coatings and/or reduced cost connection processes and/or reduced cost assembly processes. For example, aspects of the present invention may substantially or entirely obviate or substantially reduce the need for soldering (that may involve costly human processes) to make the electrical connections. Also, for example, aspects of the present invention discussed above allow for the size of the busbar clips or electrical clips at the reflective element to be reduced (typically, such elongated clips that clip to the edges of the reflective element substrates may be about 6 to 8 inches long or thereabouts), whereby the electrical clips in accordance with the present invention may have a length that is reduced to about 2 inches or less, preferably about 1 inch or less, such as ½ inch or ¼ inch or thereabouts, thus providing lower cost components.

Also, the use of a fourth surface opaque (i.e., substantially non-light-transmitting) reflecting or transmission-reducing thin film coating, such as a metallic coating (such as a chromium coating or the like, such as discussed above) allows for a sputter up/sputter down process of coating the third and fourth surfaces of the rear substrate of an electrochromic mirror cell in the same unitary vacuum-deposition process/chamber (with appropriate masking as described above) and obviates the need to use a potentially costly black or similarly opacifying tape or coating at the fourth surface (that is typically required at the rear surface of a reflective element). Typically, such black tape is relatively expensive, but the use of such costly black tape can be obviated by the novel application of an opaque reflecting or transmission-reducing thin film coating at the fourth surface. The present invention thus provides a rear substrate with a third surface transflective mirror reflector, and the process of manufacturing the reflective element may include masking the rear surface at the location where a display and/or photosensor is to be disposed and then coating (preferably simultaneous with the coating of the front surface as described above) the rear surface with a chromium or similar metallic coating (which is typically much less costly than known conventional black opacifying tapes and the like, which need to be carefully disposed at the rear surface to limit or substantially preclude formation of bubbles or imperfections that may be viewable through the third surface transflector) of sufficient thickness to be significantly light absorbing, such as a thickness of at least about 300 angstroms, more preferably at least about 500 angstroms and more preferably at least about 750 angstroms. Optionally, the third and fourth surfaces may be coated during the same sputter-up/sputter-down coating process (such as in the same vacuum-deposition chamber and/or process) or the like to further reduce the manufacturing costs. The chromium coated or similar metal coated fourth surface may then be substantially covered/protected with a low cost scatter-proofing or shatter-proofing tape, such as with a hot melt polymer film or the like (and such tape need not be any special opaque tape but can be a low cost tape and can be laid down over the chromium-coated or opaque reflecting or transmission-reducing thin film coated rear surface of the substrate in any manner, since any bubbles or imperfections that may be present will not be viewable through the opaque reflecting or transmission-reducing thin film coating at the rear surface of the reflective element).

Optionally, and desirably, the fourth surface opaque or transmission-reducing thin film metallic coating is formed of an environmentally durable metal thin film, such as a sputtered chromium or similar environmentally durable metal layer. For example, metal thin film mirror reflectors, such as of titanium and chromium and stainless steel and the like, such as are used as first surface automotive exterior mirror reflectors, have the environmental resilience and stability desired herein. To have the desired reduction in light transmission (such as transmitting, for example, less than about 1 percent of incident light through the opaque or transmission-reducing thin film coating), the transmission-reducing thin film layer or coating may have a physical thickness of at least about 300 angstroms, more preferably at least about 500 angstroms and more preferably at least about 700 angstroms, and are formed or established at the rear or fourth surface of the rear substrate by a vacuum-deposition sputter coating process.

Thus, in accordance with the present invention, an electro-optic mirror element, such as an electrochromic mirror element, is provided that comprises a front substrate and a rear substrate, with an electro-optic medium (preferably an electrochromic medium and less preferably a liquid crystal medium) disposed or sandwiched therebetween. The rearmost or fourth surface of the rear substrate comprises a sputtered, environmentally stable metallic reflector or thin film coating or layer, such as chromium metal layer or the like, that has a physical thickness selected so as to be substantially reflecting (preferably at least about 35 percent reflecting, more preferably at least about 45 percent reflecting, and more preferably at least about 55 percent reflecting) of light that passes through the electro-optic medium (at locations away from the window or aperture established through the metal thin film coating), and that has a physical thickness and material property so as to be substantially opaque to visible light incident upon the rearmost or fourth surface of the mirror reflective element (i.e., transmitting less than, for example, about 1 percent of incident light, and more preferably transmitting less than, for example, about 0.5 percent of incident light and more preferably transmitting less than, for example, about 0.1 percent of incident light). The opposing surface of the rear substrate (i.e., the third surface of the laminate sandwich assembly) is coated with a transflective reflector as described above. However, where a display is desired to be seen by the driver of the equipped vehicle through the reflective element or where a photosensor is desired to view through the reflective element, an aperture or hole or window (preferably with a tapered or non-sharp gradient in the opaque reflective thin film coating around and circumscribing the window) is established at and through the fourth surface coating at the rearmost surface of the reflective element.

Optionally, the present invention may also provide for a reduced cost aperture or window established at and through the opaque reflecting or transmission-reducing thin film coating or chromium or metallic coating at the rear surface of the substrate, such as for a video display or an information display or a sensor or the like. As discussed above, the aperture or window may be established or provided in a manner that further reduces the assembly costs of the reflective element assembly. For example, the aperture or window may have fuzzy or non-sharp edges so that it is not readily viewable and discernible to a person viewing through the reflective element, and thus may not require the location precision typically required for conventional windows, thereby further reducing the manufacturing costs associated with the reflective element assembly of the present invention. Thus, the present invention provides multiple cost-reducing aspects that reduce the content costs and the manufacturing and assembly costs associated with the reflective element assembly and mirror assembly.

The interior mirror assembly or assemblies discussed herein may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 7,310,178; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS, Optical Engineering Press, Wash. (1990), which are all hereby incorporated by reference herein in their entireties. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the reflective element may include a metallic perimeter band around the perimeter of the reflective element, such as by utilizing aspects of the reflective elements described in U.S. Pat. Nos. 7,274,501; 7,184,190; and/or 7,255,451, PCT Application No. PCT/US2006/018567, filed May 15, 2006 by Donnelly Corp. et al.; PCT Application No. PCT/US03/29776, filed Sep. 19, 2003 by Donnelly Corp. et al.; and/or PCT Application No. PCT/US03/35381, filed Nov. 5, 2003 by Donnelly Corp. et al., and/or U.S. patent application Ser. No. 11/912,576, filed Oct. 25, 2007, now U.S. Pat. No. 7,626,749; and/or Ser. No. 11/226,628, filed Sep. 14, 2005, and published Mar. 23, 2006 as U.S. Publication No. US 2006/0061008, which is hereby incorporated herein by reference in their entireties. Optionally, the perimeter band may comprise a chrome/chromium coating or metallic coating and may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. Nos. 7,184,190 and/or 7,255,451, which are hereby incorporated herein by reference in their entireties). Optionally, the mirror reflective element may comprise a frameless reflective element (such as a frameless exterior mirror assembly or a frameless interior mirror assembly), such as by utilizing aspects of the reflective elements described in U.S. Pat. Nos. 7,360,932; 7,255,451; 7,274,501; and/or 7,184,190, and/or PCT Application No. PCT/US2006/018567, filed May 15, 2006; PCT Application No. PCT/US2004/015424, filed May 18, 2004 and published on Dec. 2, 2004 as International Publication No. WO 2004/10377282; and/or U.S. patent application Ser. No. 11/912,576, filed Oct. 25, 2007, now U.S. Pat. No. 7,626,749; Ser. No. 11/226,628, filed Sep. 14, 2005, and published Mar. 23, 2006 as U.S. Publication No. US 2006/0061008; and/or Ser. No. 10/538,724, filed Jun. 13, 2005, and published Mar. 9, 2006 as U.S. Publication No. US 2006/0050018; and/or U.S. provisional applications, Ser. No. 61/187,112, filed Jun. 15, 2009; Ser. No. 61/172,022, filed Apr. 23, 2009; Ser. No. 61/249,300, filed Oct. 7, 2009; and/or Ser. No. 61/261,839, filed Nov. 17, 2009, which are hereby incorporated herein by reference in their entireties.

The mounting assembly of the mirror assembly attached to an interior portion of the vehicle, such as to an inner surface of a vehicle windshield (such as to a mounting button or attachment element adhered to the interior surface of the vehicle windshield). The mounting assembly may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. The mounting assembly may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005, and published Mar. 23, 2006 as U.S. Publication No. US 2006/0061008, and/or U.S. provisional applications, Ser. No. 61/232,201, filed Aug. 7, 2009; Ser. No. 61/162,420, filed Mar. 23, 2009; and/or Ser. No. 61/255,192, filed Oct. 27, 2009, which are hereby incorporated herein by reference in their entireties).

Optionally, the mirror assembly may include one or more displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,338,177; 7,274,501; 7,255,451; 7,195,381; 7,184,190; 5,668,663; 5,724,187 and/or 6,690,268, and/or in U.S. patent application Ser. No. 11/520,193, filed Sep. 13, 2006, now U.S. Pat. No. 7,581,859; Ser. No. 12/091,525, filed Apr. 25, 2008, now U.S. Pat. No. 7,855,755; Ser. No. 11/226,628, filed Sep. 14, 2005, and published Mar. 23, 2006 as U.S. Publication No. US 2006/0061008; Ser. No. 10/538,724, filed Jun. 13, 2005, and published Mar. 9, 2006 as U.S. Publication No. US 2006/0050018; and/or Ser. No. 11/912,576, filed Oct. 25, 2007, now U.S. Pat. No. 7,626,749, which are all hereby incorporated herein by reference in their entireties, so that the displays are viewable through the reflective element, while the display area still functions to substantially reflect light, in order to provide a generally uniform prismatic reflective element even in the areas that have display elements positioned behind the reflective element. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, which are all hereby incorporated herein by reference in their entireties.

Optionally, a display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742; and 6,124,886, and/or U.S. patent application Ser. No. 10/538,724, filed Jun. 13, 2005, and published Mar. 9, 2006 as U.S. Publication No. US 2006/0050018, which are hereby incorporated herein by reference in their entireties.

The display may comprise a video display and may utilize aspects of the video display devices or modules described in U.S. Pat. Nos. 6,690,268; 7,184,190; 7,274,501; 7,370,983; and/or 7,446,650, and/or U.S. patent application Ser. No. 12/091,525, filed Apr. 25, 2008, now U.S. Pat. No. 7,855,755; and/or Ser. No. 10/538,724, filed Jun. 13, 2005, and published Mar. 9, 2006 as U.S. Publication No. US 2006/0050018, which are all hereby incorporated herein by reference in their entireties. The video display may be operable to display images captured by one or more imaging sensors or cameras at the vehicle. The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The camera or camera module may comprise any suitable camera or imaging sensor, and may utilize aspects of the cameras or sensors described in U.S. patent application Ser. No. 12/091,359, filed Apr. 24, 2008, and published Oct. 1, 2009 as U.S. Publication No. US 2009/0244361; and/or Ser. No. 10/534,632, filed May 11, 2005, now U.S. Pat. No. 7,965,336; and/or U.S. Pat. No. 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; and 7,004,606; and/or U.S. patent application Ser. No. 11/315,675, filed Dec. 22, 2005, now U.S. Pat. No. 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008, and/or PCT Application No. PCT/US2008/078700, filed Oct. 3, 2008, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; and 7,339,149, and U.S. patent application Ser. No. 11/105,757, filed Apr. 14, 2005, now U.S. Pat. No. 7,526,103, which are all hereby incorporated herein by reference in their entireties, a rain sensor, such as the types disclosed in commonly assigned U.S. Pat. Nos. 6,353,392; 6,313,454; 6,320,176; and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; and 6,946,978, and/or in U.S. patent application Ser. No. 10/643,602, filed Aug. 19, 2003, now U.S. Pat. No.

7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,038,577; 5,929,786 and/or 5,786,772, and/or U.S. patent application Ser. No. 11/239,980, filed Sep. 30, 2005, now U.S. Pat. No. 7,881,496; and/or Ser. No. 11/315,675, filed Dec. 22, 2005, now U.S. Pat. No. 7,720,580, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268; and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005, and published Mar. 23, 2006 as U.S. Publication No. US 2006/0061008, and/or Ser. No. 12/578,732, filed Oct. 14, 2009, which are hereby incorporated herein by reference in their entireties.

Optionally, the mirror assembly may include user inputs that may comprise buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 6,001,486; 6,310,611; 6,320,282; 6,627,918; 6,690,268; 7,224,324; 7,249,860; 7,253,723; 7,255,451; 7,360,932; and/or 7,446,924, and/or U.S. patent application Ser. No. 10/538,724, filed Jun. 13, 2005, and published Mar. 9, 2006 as U.S. Publication No. US 2006/0050018, and/or Ser. No. 12/576,550, filed Oct. 12, 2009, now U.S. Pat. No. 8,465,161, which are all hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or U.S. patent application Ser. No. 10/538,724, filed Jun. 13, 2005, and published Mar. 9, 2006 as U.S. Publication No. US 2006/0050018, and/or U.S. patent application Ser. No. 10/529,715, filed Mar. 30, 2005, now U.S. Pat. No. 7,657,052, which are all hereby incorporated herein by reference in their entireties.

Optionally, the mirror assembly may include one or more other accessories at or within the mirror casing or otherwise associated with or near the mirror assembly, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093 and/or U.S. provisional application Ser. No. 61/785,565, filed May 15, 2009, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005, now U.S. Pat. No. 7,657,052, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786; 5,786,772; 7,492,281; 7,038,577 and 6,882,287; and/or U.S. patent application Ser. No. 11/315,675, filed Dec. 22, 2005, now U.S. Pat. No. 7,720,580; and/or Ser. No. 12/446,507, filed Apr. 21, 2009, now U.S. Pat. No. 8,058,977, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, and/or U.S. provisional application Ser. No. 61/785,565, filed May 15, 2009, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 6,690,268 and 6,847,487, and/or U.S. patent application Ser. No. 11/239,980, filed Sep. 30, 2005, now U.S. Pat. No. 7,881,496; Ser. No. 11/105,757, filed Apr. 14, 2005, now U.S. Pat. No. 7,526,103; Ser.

No. 12/578,732, filed Oct. 14, 2009; and/or Ser. No. 12/508,840, filed Jul. 24, 2009 and published Jan. 28, 2010 as U.S. Pub. No. US 2010/0020170, an alert system, such as an alert system of the types described in PCT Application No. PCT/US2010/25545, filed Feb. 26, 2010, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or U.S. provisional application Ser. No. 60/611,796, filed Sep. 21, 2004), and/or an ONSTAR® system, a compass, such as disclosed in U.S. Pat. Nos. 5,924,212; 4,862,594; 4,937,945; 5,131,154; 5,255,442; and/or 5,632,092, a control system, such as a control system of the types described in U.S. provisional application Ser. No. 61/186,573, filed Jun. 12, 2009, and/or any other accessory or circuitry or the like (with the disclosures of the above-referenced patents and patent applications and provisional applications and PCT applications being hereby incorporated herein by reference in their entireties).

Changes and modifications to the specifically described embodiments may be carried out without departing from the principles of the present invention, which is intended to be limited only by the scope of the appended claims as interpreted according to the principles of patent law.

The invention claimed is:

1. A method of coating a rear glass substrate for an electrochromic reflective element of a rearview mirror assembly of a vehicle, said method comprising:

- providing a fixture, said fixture comprising a recess shaped to receive a rear glass substrate therein;
- wherein said fixture comprises a masking element extending from a perimeter region of said recess over a portion of said recess, and wherein said masking element comprises a disc portion and an arm portion extending between said disc portion and said perimeter region of said recess of said fixture;
- positioning a rear glass substrate in said recess, said rear glass substrate having a surface exposed at said fixture for coating of said surface during a vacuum coating process;
- wherein, with said rear glass substrate received in said recess, said masking element extends over a portion of said surface of said rear glass substrate and is spaced from said surface of said rear glass substrate;
- coating said surface of said rear glass substrate with a mirror reflector coating via the vacuum coating process, wherein coating of said surface comprises sputter deposition in a vacuum deposition chamber of said mirror reflector coating at said surface of said rear glass substrate;
- wherein said arm portion and said disc portion are shaped such that said mirror reflector coating is deposited at said surface of said rear glass substrate behind said arm portion but is substantially not deposited behind said disc portion so as to establish a window region through said mirror reflector coating at said surface of said rear glass substrate; and
- removing said coated rear glass substrate from said fixture, wherein said mirror reflector coating is substantially mirror reflecting at said surface of said coated rear glass substrate except at said window region.

2. The method of claim 1, wherein said mirror reflector coating deposited around said window region locally varies in physical thickness, with a minimum physical thickness of said mirror reflector coating being closest to said window region and with the physical thickness of said mirror reflector coating generally increasing to a generally maximum physical thickness of said mirror reflector coating at a distance from said window region.

3. The method of claim 2, wherein said mirror reflector coating comprises a tapered physical thickness that tapers from said maximum physical thickness of said mirror reflector coating as deposited at said surface of said rear glass substrate remote from said window region to said minimum physical thickness around and circumscribing said window region.

4. The method of claim 2, wherein said disc portion has a first width dimension and said arm portion has a second width dimension, and wherein said first width dimension is greater than said second width dimension.

5. The method of claim 4, wherein said second width dimension is small enough so that said mirror reflector coating is at least partially deposited on said surface of said rear glass substrate behind said arm portion, and wherein said first width dimension is large enough so that said mirror reflector coating is substantially not deposited on said surface of said rear glass substrate behind at least a center region of said disc portion.

6. The method of claim 1, wherein said mirror reflector coating comprises a metal thin film coating.

7. The method of claim 1, comprising providing circuitry on a surface of said rear glass substrate, wherein said circuitry comprises a first electrical connector for electrically conductively connecting to a transparent conductive coating at a surface of a front substrate of said mirror reflective element and a second electrical connector for electrically conductively connecting to a conductive coating at a surface of said rear glass substrate.

8. The method of claim 7, wherein said second electrical connector electrically conductively connects to a conductive coating at said surface of said rear glass substrate that is coated with said mirror reflector coating.

9. The method of claim 7, wherein said second electrical connector electrically conductively connects to a conductive coating at a surface of said rear glass substrate that is opposite said surface that is coated with said mirror reflector coating.

10. The method of claim 7, wherein said first electrical connector comprises a stamped metallic connector having a wire receiving portion and a substrate attaching portion and said second electrical connector comprises a stamped metallic connector having a wire receiving portion and a substrate attaching portion.

11. The method of claim 7, wherein providing circuitry comprises clipping a clip element of said second electrical connector onto a perimeter edge region of said rear glass substrate.

12. The method of claim 1, wherein said disc portion is generally circular shaped.

13. A method of coating a rear glass substrate for an electrochromic reflective element of a rearview mirror assembly of a vehicle, said method comprising:

- providing a fixture, said fixture comprising a recess shaped to receive a rear glass substrate therein;

wherein said fixture comprises a masking element extending from a perimeter region of said recess over a portion of said recess, and wherein said masking element comprises a disc portion and an arm portion extending between said disc portion and said perimeter region of said recess of said fixture;

wherein said disc portion is generally circular shaped;

positioning a rear glass substrate in said recess, said rear glass substrate having a surface exposed at said fixture for coating of said surface during a vacuum coating process;

wherein, with said rear glass substrate received in said recess, said masking element extends over a portion of said surface of said rear glass substrate and is spaced from said surface of said rear glass substrate;

coating said surface of said rear glass substrate with a mirror reflector coating via the vacuum coating process, wherein coating of said surface comprises sputter deposition in a vacuum deposition chamber of said mirror reflector coating at said surface of said rear glass substrate;

wherein said mirror reflector coating comprises a metal thin film coating;

wherein said arm portion and said disc portion are shaped such that said mirror reflector coating is deposited at said surface of said rear glass substrate behind said arm portion but is substantially not deposited behind said disc portion so as to establish a window region through said mirror reflector coating at said surface of said rear glass substrate;

wherein said mirror reflector coating deposited around said window region locally varies in physical thickness; and removing said coated rear glass substrate from said fixture, wherein said mirror reflector coating is substantially mirror reflecting at said surface of said coated rear glass substrate except at said window region.

14. The method of claim 13, wherein said mirror reflector coating comprises a tapered physical thickness that tapers from said maximum physical thickness of said mirror reflector coating as deposited at said surface of said rear glass substrate remote from said window region to said minimum physical thickness around and circumscribing said window region.

15. The method of claim 13, wherein said disc portion has a first width dimension and said arm portion has a second width dimension, and wherein said first width dimension is greater than said second width dimension, and wherein said second width dimension is small enough so that said mirror reflector coating is at least partially deposited on said surface of said rear glass substrate behind said arm portion, and wherein said first width dimension is large enough so that said mirror reflector coating is substantially not deposited on said surface of said rear glass substrate behind at least a center region of said disc portion.

16. The method of claim 13, comprising providing circuitry on a surface of said rear glass substrate, wherein said circuitry comprises an electrical connector for electrically conductively connecting to a conductive coating at a surface of said rear glass substrate, and wherein said electrical connector comprises a stamped metallic connector having a wire receiving portion and a substrate attaching portion, and wherein said electrical connector electrically conductively connects to one of (i) a conductive coating at said surface of said rear glass substrate that is coated with said mirror reflector coating and (ii) a conductive coating at a surface of said rear glass substrate that is opposite said surface that is coated with said mirror reflector coating.

17. A method of coating a rear glass substrate for an electrochromic reflective element of a rearview mirror assembly of a vehicle, said method comprising:

providing a fixture, said fixture comprising a recess shaped to receive a rear glass substrate therein;

wherein said fixture comprises a masking element extending from a perimeter region of said recess over a portion of said recess, and wherein said masking element comprises a disc portion and an arm portion extending between said disc portion and said perimeter region of said recess of said fixture;

positioning a rear glass substrate in said recess, said rear glass substrate having a surface exposed at said fixture for coating of said surface during a vacuum coating process;

wherein, with said rear glass substrate received in said recess, said masking element extends over a portion of said surface of said rear glass substrate and is spaced from said surface of said rear glass substrate;

coating said surface of said rear glass substrate with a mirror reflector coating via the vacuum coating process, wherein coating of said surface comprises sputter deposition in a vacuum deposition chamber of said mirror reflector coating at said surface of said rear glass substrate;

wherein said mirror reflector coating comprises a metal thin film coating;

wherein said arm portion and said disc portion are shaped such that said mirror reflector coating is deposited at said surface of said rear glass substrate behind said arm portion but is substantially not deposited behind said disc portion so as to establish a window region through said mirror reflector coating at said surface of said rear glass substrate;

wherein said mirror reflector coating comprises a tapered physical thickness that tapers from said maximum physical thickness of said mirror reflector coating as deposited at said surface of said rear glass substrate remote from said window region to said minimum physical thickness around and circumscribing said window region; and removing said coated rear glass substrate from said fixture, wherein said mirror reflector coating is substantially mirror reflecting at said surface of said coated rear glass substrate except at said window region.

18. The method of claim 17, wherein said mirror reflector coating deposited around said window region has a minimum physical thickness of said mirror reflector coating closest to said window region and wherein the physical thickness of said mirror reflector coating generally increases from said minimum physical thickness to a generally maximum physical thickness of said mirror reflector coating at a distance from said window region.

19. The method of claim 17, wherein said disc portion has a first width dimension and said arm portion has a second width dimension, and wherein said first width dimension is greater than said second width dimension, and wherein said second width dimension is small enough so that said mirror reflector coating is at least partially deposited on said surface of said rear glass substrate behind said arm portion, and wherein said first width dimension is large enough so that said mirror reflector coating is substantially not deposited on said surface of said rear glass substrate behind at least a center region of said disc portion.

20. The method of claim 17, wherein said disc portion is generally circular shaped.

* * * * *